US009491310B2

(12) United States Patent
Griot et al.

(10) Patent No.: US 9,491,310 B2
(45) Date of Patent: Nov. 8, 2016

(54) TECHNIQUES FOR DETERMINING TRAFFIC VOLUMES SERVED OVER MULTIPLE CELLS OF A WIRELESS COMMUNICATION NETWORK

(71) Applicant: QUALCOMM Incorporated, San Diego, CA (US)

(72) Inventors: Miguel Griot, La Jolla, CA (US); Durga Prasad Malladi, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 14/502,009

(22) Filed: Sep. 30, 2014

(65) Prior Publication Data
US 2015/0133081 A1    May 14, 2015

Related U.S. Application Data

(60) Provisional application No. 61/903,915, filed on Nov. 13, 2013.

(51) Int. Cl.
*H04M 15/00*    (2006.01)
*H04L 12/14*    (2006.01)
(Continued)

(52) U.S. Cl.
CPC .......... *H04M 15/58* (2013.01); *H04L 12/1435* (2013.01); *H04M 15/41* (2013.01); *H04M 15/8033* (2013.01); *H04M 15/8083* (2013.01); *H04W 4/26* (2013.01); *H04W 24/08* (2013.01)

(58) Field of Classification Search
CPC ........... H04M 15/58; H04M 15/8033; H04M 15/41; H04M 15/8083; H04L 12/1435; H04W 4/26; H04W 24/08
See application file for complete search history.

(56) References Cited

U.S. PATENT DOCUMENTS

| 9,037,109 B1* | 5/2015 | Singh ...................... H04W 4/24 455/406 |
| 2008/0119160 A1 | 5/2008 | Andriantsiferana et al. |

(Continued)

FOREIGN PATENT DOCUMENTS

WO    WO-2013031498 A1    3/2013

OTHER PUBLICATIONS

3GPP, "3rd Generation Partnership Project; Technical Specification Group Services and System Aspects; Network Based IP Flow Mobility (Release 12)", 3GPP TR 23.861 v1.7.0 (Nov. 2012) Technical Report, Nov. 2012, 79 pgs., 3rd Generation Partnership Project, Sophia Antipolis, France.

(Continued)

*Primary Examiner* — Brandon Miller
(74) *Attorney, Agent, or Firm* — Holland & Hart LLP

(57) ABSTRACT

Techniques are described for traffic volume determination and reporting by an access node and/or a node of a core network in a wireless communications system. One or more wireless connections may be established with a user equipment (UE) to serve one or more streams of traffic using a first cell and a second cell, which may have different cell characteristics. A first traffic volume for the UE may be determined based on traffic volume served over the first cell, and a second traffic volume for the UE may be determined based on traffic volume served over the second cell. A charging data record may be generated based on the first traffic volume and the second traffic volume. Traffic volume served over the first cell then may be charged at a different rate that traffic served over the second cell.

30 Claims, 15 Drawing Sheets

(51) Int. Cl.
*H04W 4/26* (2009.01)
*H04W 24/08* (2009.01)

(56) References Cited

U.S. PATENT DOCUMENTS

| | | | | |
|---|---|---|---|---|
| 2008/0192697 A1* | 8/2008 | Shaheen | ........... | H04W 36/0061 370/331 |
| 2008/0311885 A1* | 12/2008 | Dawson | ............ | G06Q 10/1091 455/406 |
| 2012/0282942 A1* | 11/2012 | Uusitalo | ............... | H04W 16/14 455/452.2 |
| 2013/0143550 A1* | 6/2013 | Ostrup et al. | ................. | 455/424 |
| 2013/0143561 A1* | 6/2013 | Nuss et al. | .................... | 455/436 |
| 2013/0210446 A1* | 8/2013 | Klein et al. | ................... | 455/450 |
| 2014/0024383 A1* | 1/2014 | Rahman | ........... | H04W 28/0268 455/445 |
| 2014/0073317 A1* | 3/2014 | Zhou et al. | ................... | 455/424 |
| 2014/0098732 A1* | 4/2014 | Chen | ................... | H04W 72/042 370/312 |
| 2014/0098762 A1* | 4/2014 | Ghai et al. | .................... | 370/329 |
| 2014/0194093 A1 | 7/2014 | Tsuda | | |
| 2015/0110008 A1* | 4/2015 | Puthenpura | ............. | H04W 8/26 370/329 |
| 2015/0207700 A1* | 7/2015 | Elmdahl | ............... | H04W 24/08 370/241.1 |

OTHER PUBLICATIONS

ISA/EPO, International Search Report and Written Opinion of the International Searching Authority, Int'l App. No. PCT/US2014/058544, Dec. 15, 2014, European Patent Office, Rijswijk, NL 12 pgs.

IPEA/EPO, Second Written Opinion of the International Preliminary Examining Authority, Int'l App. No. PCT/US2014/058544, Oct. 20, 2015, European Patent Office, Rijswijk, NL 9 pgs.

* cited by examiner ical examples, a method
TECHNIQUES FOR DETERMINING TRAFFIC VOLUMES SERVED OVER MULTIPLE CELLS OF A WIRELESS COMMUNICATION NETWORK

CROSS REFERENCES

The present application for patent claims priority to U.S. Provisional Patent Application No. 61/903,915 by Griot et al., entitled "Techniques for Determining Traffic Volumes Served Over Multiple Cells of a Wireless Communication Network," filed Nov. 13, 2013, assigned to the assignee hereof, which is hereby incorporated by reference in its entirety.

FIELD OF THE DISCLOSURE

The following relates to wireless communication, and more specifically to techniques for determining traffic volumes served over multiple cells in a wireless communication network.

BACKGROUND OF THE DISCLOSURE

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a wireless wide area network (WWAN) may include a number of base stations, such as NodeBs (NBs) or evolved NodeBs (eNBs). The access points of a wireless local area network (WLAN) may include a number of WLAN access points, such as Wi-Fi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As WWANs become more heavily utilized, operators are seeking ways to increase capacity. One approach may include the use of WLANs to offload some of the traffic and/or signaling of a WWAN. WLANs (such as Wi-Fi networks) may offer attractive features because, unlike WWANs that operate in a licensed spectrum, Wi-Fi networks may operate in an unlicensed spectrum, and are thus available for use by various entities subject to established rules for providing fair access to the spectrum. In some deployments, various operators may wish to access the unlicensed spectrum for use in establishing a connection to a UE. In some cases, a wireless connection may be established using a licensed spectrum, and a second wireless connection may be established using unlicensed spectrum. The wireless connection using the licensed spectrum may be established using a first, or primary, cell, and the second wireless connection using the unlicensed spectrum may be established using a second, or secondary, cell. The first and second cells may or may not be collocated. Some operators may desire to provide different charge rates for traffic served over such different cells.

SUMMARY

The present disclosure relates to one or more techniques for wireless communications, and more particularly, to traffic volume determination and reporting by an access node and/or a node of a core network in a wireless communications system. One or more wireless connections may be established with a UE using a first cell and a second cell. For example, the first cell and the second cell may operate using different radio access technologies (RATs). In another example, the first cell may operate using a licensed spectrum and the second cell may operate using an unlicensed spectrum. In other examples, the first cell may operate using a licensed spectrum and the second cell may operate using an authorized shared access (ASA) spectrum.

A first traffic volume for the UE may be determined based on traffic served over the first cell, and a second traffic volume for the UE may be determined based on traffic served over the second cell. The first cell and the second cell may be associated with a same access node, such as an eNodeB, or with different access nodes. One or both of the first traffic volume and the second traffic volume may be reported to another node, such as a serving gateway (S-GW) or a packet data network gateway (P-GW). The first traffic volume and the second traffic volume may be associated with a same stream of traffic in which different portions of the stream of traffic are served over the first cell and the second cell. In another example, the first traffic volume and the second traffic volume may be associated with different stream of traffic in which a first stream of traffic may be served over the first cell and a second stream of traffic may be served over the second cell. A charging data record may be generated based on the first traffic volume and the second traffic volume. Traffic served over the first cell then may be charged at a different rate than traffic served over the second cell.

In some examples, a network element in a wireless communications network, may receive a first traffic volume and a second traffic volume for a UE, and generate a charging data record (CDR) based on the first traffic volume and the second traffic volume. The first traffic volume and the second traffic volume may be received, for example, from an access node that serves both a first wireless connection between a first cell and the UE and a second wireless connection between a second cell and the UE. The first traffic volume may indicate an amount of traffic served over the first wireless connection, and the second traffic volume may indicate an amount of traffic served over the second wireless connection. In an example, the first traffic volume and the second traffic volume may be received from the same access node or different access nodes, with the first traffic volume and the second traffic volume being associated with a same stream of traffic. In another example, the first traffic volume and the second traffic volume may be associated with different stream of traffic served by the same access node or different access nodes.

According to a first set of illustrative examples, a method for wireless communication in a wireless communications network may include determining a first traffic volume served between a first cell and a user equipment (UE); determining a second traffic volume served between a second cell and the UE; and reporting at least one of the first traffic volume and the second traffic volume to a node of the wireless communication network. In certain examples, the first traffic volume and/or the second traffic volume may be associated with a same stream of traffic. In examples, the first traffic volume and/or the second traffic volume may include traffic associated with one or more of an Access Point Name (APN), a default data bearer, a dedicated data bearer, an IP flow, or a TCP connection. The first traffic volume may be, for example, charged differently than the second traffic volume.

In some examples, the first cell may utilize a licensed radio frequency spectrum band and the second cell may utilize an unlicensed radio frequency spectrum band. Additionally or alternatively, the first cell and the second cell may utilize different radio access technologies (RATs). The reporting of the first traffic volume and the second traffic volume may be performed, in certain examples, based at least in part on one or more of: an activation of a new radio bearer; a modification of an existing radio bearer; a deactivation of an existing radio bearer; a mobility event for the UE; or at least one of the first traffic volume and the second traffic volume exceeding a threshold. In other examples, the reporting the first traffic volume and the second traffic volume may include reporting one or more of: an indication of the first traffic volume and the second traffic volume; an indication of a radio access technology (RAT) used to serve the first traffic volume and the second traffic volume; an indication of whether each of the first cell or the second cell uses a licensed radio frequency spectrum band or an unlicensed radio frequency spectrum band; an identity of the first cell and the second cell; a timestamp; or radio bearer characteristics for each radio bearer used by the first cell and the second cell.

In certain examples, the first traffic volume and the second traffic volume may be determined for downlink traffic volume and/or uplink traffic volume. In some examples, the first traffic volume and the second traffic volume may include data traffic volumes. Additionally or alternatively, the first traffic volume and the second traffic volume may include signaling traffic volumes, which may include one or more of radio resource control (RRC) traffic volumes, network access stratum (NAS) signaling traffic volumes, or control channel physical signaling traffic volumes. The first traffic volume and the second traffic volume, in some examples, may include traffic volumes for each radio bearer served by the first cell and the second cell, and/or may include traffic volumes for each service data flow (SDF) provided by the first cell and the second cell.

According to certain examples, the first traffic volume and the second traffic volume may be reported over a S1-U interface. For example, the first traffic volume and the second traffic volume are reported as part of a GTP-U header, and may be reported over a S1-MME interface. The first traffic volume and the second traffic volume may be reported to a Charging Data Function (CDF), according to some examples. In certain examples, the reporting of the first traffic volume and the second traffic volume may be performed periodically.

According to a second set of illustrative examples, a method for wireless communication by an access node in a wireless communications network may include serving a first wireless connection between a first cell and a user equipment (UE) for communicating a first traffic volume; serving a second wireless connection between a second cell and the UE for communicating a second traffic volume; determining at least one of the first traffic volume and the second traffic volume; and reporting the at least one of the first traffic volume and the second traffic volume from the access node to another node. In certain examples, the first traffic volume and/or the second traffic volume may be associated with a same stream of traffic. In examples, the first traffic volume and/or the second traffic volume may include traffic associated with one or more of an Access Point Name (APN), a default data bearer, a dedicated data bearer, an IP flow, or a TCP connection. The first traffic volume may be, for example, charged differently than the second traffic volume.

In some examples, the first cell may utilize a licensed radio frequency spectrum band and the second cell may utilize an unlicensed radio frequency spectrum band. Additionally or alternatively, the first cell and the second cell may utilize different radio access technologies (RATs). The reporting of the first traffic volume and the second traffic volume may be performed, in certain examples, based at least in part on one or more of: an activation of a new radio bearer; a modification of an existing radio bearer; a deactivation of an existing radio bearer; a mobility event for the UE; or at least one of the first traffic volume and the second traffic volume exceeding a threshold. In other examples, the reporting the first traffic volume and the second traffic volume may include reporting one or more of: an indication of the first traffic volume and the second traffic volume; an indication of a radio access technology (RAT) used to serve the first traffic volume and the second traffic volume; an indication of whether each of the first cell or the second cell uses a licensed radio frequency spectrum band or an unlicensed radio frequency spectrum band; an identity of the first cell and the second cell; a timestamp; or radio bearer characteristics for each radio bearer used by the first cell and the second cell.

In certain examples, the first traffic volume and the second traffic volume may be determined for downlink traffic volume and/or uplink traffic volume. In some examples, the first traffic volume and the second traffic volume may include data traffic volumes. Additionally or alternatively, the first traffic volume and the second traffic volume may include signaling traffic volumes, which may include one or more of radio resource control (RRC) traffic volumes, network access stratum (NAS) signaling traffic volumes, or control channel physical signaling traffic volumes. The first traffic volume and the second traffic volume, in some examples, may include traffic volumes for each radio bearer served by the first cell and the second cell, and/or may include traffic volumes for each service data flow (SDF) provided by the first cell and the second cell.

According to certain examples, the first traffic volume and the second traffic volume may be reported over a S1-U interface. For example, the first traffic volume and the second traffic volume are reported as part of a GTP-U header, and may be reported over a S1-MME interface. The first traffic volume and the second traffic volume may be reported to a Charging Data Function (CDF), according to some examples. In certain examples, the reporting of the first traffic volume and the second traffic volume may be performed periodically.

According to a third set of illustrative examples, a method for determining user equipment (UE) charge information by a first network element in a wireless communications network may include receiving at least a first traffic volume and a second traffic volume for the UE, the first traffic volume may indicate an amount of traffic served between the UE and a first cell, and the second traffic volume may indicate an amount of traffic served between the UE and a second cell; and generating a charging data record based on the first traffic volume and the second traffic volume. In some examples, the first and second traffic volumes may be associated with a same stream of traffic provided to the UE. The method may also include, for example, forwarding the received first traffic volume and the second traffic volume to a second network element. In certain examples, the first network element may include a mobility management entity (MME) and the second network element may include one or more of a serving gateway or packet data network gateway. In other examples, the first network element may include a serving gateway and the second network element may include a packet data network gateway.

In certain examples, generating the charging data record may include calculating a charge for the first traffic volume based on a first charge rate; and calculating a charge for the second traffic volume based on a second charge rate that is different than the first charge rate. The second wireless connection between the second cell and the UE may be, in some examples, established using an unlicensed radio frequency spectrum band. In some examples, the second wireless connection and the first wireless connection may utilize different radio access technologies (RATs).

In a fourth set of illustrative examples, a method for determining user equipment (UE) charge information by a first network element in a wireless communications network may include receiving at least a first traffic volume and a second traffic volume for the UE from an access node that serves a first wireless connection between a first cell and the UE and a second wireless connection between a second cell and the UE, the first traffic volume may indicate an amount of traffic served over the first wireless connection, and the second traffic volume may indicate an amount of traffic served over the second wireless connection; and generating a charging data record based on the first traffic volume and the second traffic volume. In some examples, the first and second traffic volumes may be associated with a same stream of traffic provided to the UE. The method may also include, for example, forwarding the received first traffic volume and the second traffic volume to a second network element. In certain examples, the first network element may include a mobility management entity (MME) and the second network element may include one or more of a serving gateway or packet data network gateway. In other examples, the first network element may include a serving gateway and the second network element may include a packet data network gateway.

In certain examples, generating the charging data record may include calculating a charge for the first traffic volume based on a first charge rate; and calculating a charge for the second traffic volume based on a second charge rate that is different than the first charge rate. The second wireless connection between the second cell and the UE may be, in some examples, established using an unlicensed radio frequency spectrum band. In some examples, the second wireless connection and the first wireless connection may utilize different radio access technologies (RATs).

In a fifth set of illustrative examples an apparatus for wireless communication in a wireless communications network may include means for determining a first traffic volume served between a first cell and a user equipment (UE); means for determining a second traffic volume served between a second cell and the UE; and means for reporting at least one of the first traffic volume and the second traffic volumes to a node of the wireless communication network.

In certain examples, the apparatus may include means for implementing one or more aspects of the first set of illustrative examples described above.

In a sixth set of illustrative examples, an apparatus for wireless communication by an access node in a wireless communications network may include means for serving a first wireless connection between a first cell and a user equipment (UE) for communicating a first traffic volume; means for serving a second wireless connection between a second cell and the UE for communicating a second traffic volume; means for determining at least one of the first traffic volume and the second traffic volume; and means for reporting the at least one of the first traffic volume and the second traffic volumes from the access node to another node.

In certain examples, the apparatus may include means for implementing one or more aspects of the second set of illustrative examples described above.

In a seventh set of illustrative examples, an apparatus for determining user equipment (UE) charge information by a first network element in a wireless communications network may include means for receiving at least a first traffic volume and a second traffic volume for the UE, the first traffic volume may indicate an amount of traffic served between the UE and a first cell, and the second traffic volume may indicate an amount of traffic served between the UE and a second cell; and means for generating a charging data record based on the first traffic volume and the second traffic volume.

In certain examples, the apparatus may include means for implementing one or more aspects of the third set of illustrative examples described above.

In an eighth set of illustrative examples, an apparatus for determining user equipment (UE) charge information by a first network element in a wireless communications network may include means for receiving at least a first traffic volume and a second traffic volume for the UE from an access node that serves a first wireless connection between a first cell and the UE and a second wireless connection between a second cell and the UE, the first traffic volume may indicate an amount of traffic served over the first wireless connection, and the second traffic volume may indicate an amount of traffic served over the second wireless connection; and means for generating a charging data record based on the first traffic volume and the second traffic volume.

In certain examples, the apparatus may include means for implementing one or more aspects of the fourth set of illustrative examples described above.

In a ninth set of illustrative examples, an apparatus for wireless communications may include a processor; memory in electronic communication with the processor. Instructions stored in the memory may be executable by the processor to cause the apparatus to: determine a first traffic volume served between a first cell and a user equipment (UE); determine a second traffic volume served between a second cell and the UE; and report at least one of the first traffic volume and the second traffic volumes to a node of the wireless communication network.

In certain examples, the at least one processor may be configured to execute code stored on the memory to implement one or more aspects of first set of illustrative examples described above.

In a tenth set of illustrative examples, an apparatus for wireless communications by an access node of a wireless communications network may include a processor; and memory in electronic communication with the processor. Instructions stored in the memory may be executable by the processor to cause the apparatus to: serve a first wireless connection between a first cell and a user equipment (UE) for communicating a first traffic volume; serve a second wireless connection between a second cell and the UE for communicating a second traffic volume; determine at least one of the first traffic volume and the second traffic volume; and report the at least one of the first traffic volume and the second traffic volumes from the access node to another node.

In certain examples, the at least one processor may be configured to execute code stored on the memory to implement one or more aspects of second set of illustrative examples described above.

In an eleventh set of illustrative examples, an apparatus for determining user equipment (UE) charge information by a first network element in a wireless communications network may include a processor; and memory in electronic communication with the processor. Instructions stored in the memory may be executable by the processor to cause the apparatus to: receive at least a first traffic volume and a second traffic volume for the UE, the first traffic volume may indicate an amount of traffic served between the UE and a first cell, and the second traffic volume may indicate an amount of traffic served between the UE and a second cell; and generate a charging data record based on the first traffic volume and the second traffic volume.

In certain examples, the at least one processor may be configured to execute code stored on the memory to implement one or more aspects of third set of illustrative examples described above.

In a twelfth set of illustrative examples, an apparatus for determining user equipment (UE) charge information by a first network element in a wireless communications network may include a processor; and memory in electronic communication with the processor. Instructions stored in the memory may be executable by the processor to cause the apparatus to: receive at least a first traffic volume and a second traffic volume for the UE from an access node that serves a first wireless connection between a first cell and the UE and a second wireless connection between a second cell and the UE, the first traffic volume may indicate an amount of traffic served over the first wireless connection, and the second traffic volume may indicate an amount of traffic served over the second wireless connection; and generate a charging data record based on the first traffic volume and the second traffic volume.

In certain examples, the at least one processor may be configured to execute code stored on the memory to implement one or more aspects of fourth set of illustrative examples described above.

In a thirteenth set of illustrative examples, a computer program product for wireless communications may include a non-transitory computer-readable medium storing instructions executable by a processor. The instructions may be executable by the processor to cause a wireless communications apparatus to: determine a first traffic volume served between a first cell and a user equipment (UE); determine a second traffic volume served between a second cell and the UE; and report at least one of the first traffic volume and the second traffic volumes to a node of the wireless communication network.

In certain examples, the computer-readable medium may store instructions configured to cause the processor to implement one or more aspects of first set of illustrative examples described above.

In a fourteenth set of illustrative examples, a computer program product for wireless communications by an access node of a wireless communications network may include a non-transitory computer-readable medium storing instructions executable by a processor. The instructions may be executable by the processor to cause the access node to: serve a first wireless connection between a first cell and a user equipment (UE) for communicating a first traffic volume; serve a second wireless connection between a second cell and the UE for communicating a second traffic volume; determine at least one of the first traffic volume and the second traffic volume; and report the at least one of the first traffic volume and the second traffic volumes from the access node to another node.

In certain examples, the computer-readable medium may store instructions configured to cause the processor to implement one or more aspects of second set of illustrative examples described above.

In a fourteenth set of illustrative examples, a computer program product for determining user equipment (UE) charge information by a first network element in a wireless communications network may include a non-transitory computer-readable medium storing instructions executable by a processor. The instructions may be executable by the processor to cause a wireless communications apparatus to: receive at least a first traffic volume and a second traffic volume for the UE, the first traffic volume may indicate an amount of traffic served between the UE and a first cell, and the second traffic volume may indicate an amount of traffic served between the UE and a second cell; and generate a charging data record based on the first traffic volume and the second traffic volume.

In certain examples, the computer-readable medium may store instructions configured to cause the processor to implement one or more aspects of third set of illustrative examples described above.

In a fourteenth set of illustrative examples, a computer program product for determining user equipment (UE) charge information by a first network element in a wireless communications network may include a non-transitory computer-readable medium storing instructions executable by a processor. The instructions may be executable by the processor to cause a wireless communications apparatus to: receive at least a first traffic volume and a second traffic volume for the UE from an access node that serves a first wireless connection between a first cell and the UE and a second wireless connection between a second cell and the UE, the first traffic volume may indicate an amount of traffic served over the first wireless connection, and the second traffic volume may indicate an amount of traffic served over the second wireless connection; and generate a charging data record based on the first traffic volume and the second traffic volume.

In certain examples, the computer-readable medium may store instructions configured to cause the processor to implement one or more aspects of fourth set of illustrative examples described above.

Further scope of the applicability of the described techniques will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
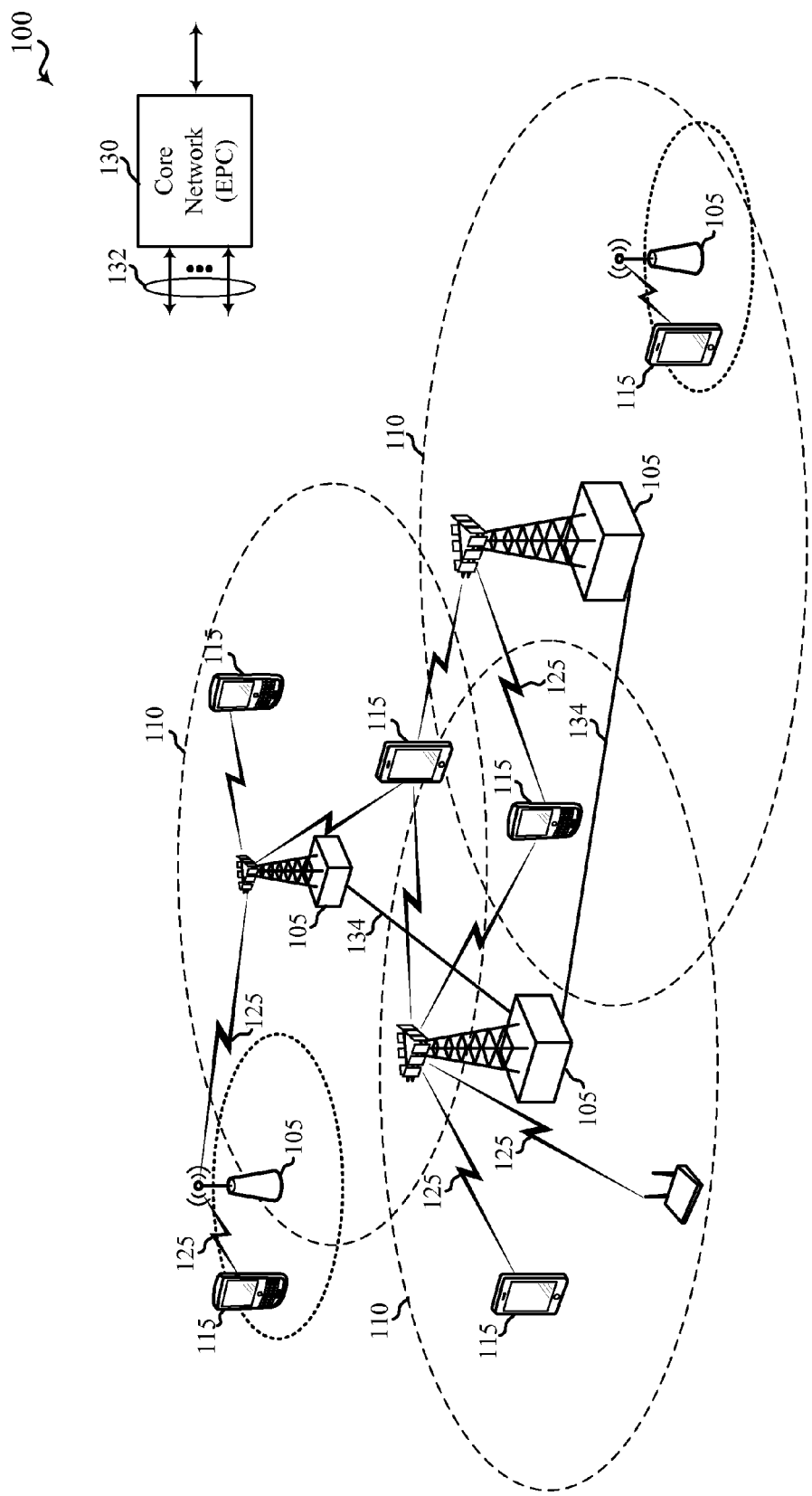
FIG. 1 shows a diagram illustrating an example of a wireless communications system, in accordance with aspects of the present disclosure.

Techniques are described in which different cells may be used in communications with a user equipment (UE). For example, licensed, unlicensed and authorized shared access (ASA) radio frequency spectrum bands may be used for WWAN communications (e.g., Long Term Evolution (LTE) communications) with a UE. LTE communications over an authorized shared access (ASA) radio frequency spectrum band may be referred to herein as LTE authorized shared access (LTE-A) communications.

With increasing data traffic in WWANs, offloading at least some data traffic to unlicensed spectrum may provide WWAN operators with opportunities for enhanced data transmission capacity. According to various aspects of the present disclosure, a UE provided with network access by an operator may be served by one or more cells that may operate using licensed, unlicensed or authorized shared spectrum. Traffic served by different cells or different RATs may be charged for differently by the operator. For example, traffic served over unlicensed spectrum may be charged at a lower rate than traffic served over licensed spectrum. In another example, traffic served over authorized shared spectrum may be charged at a lower rate than traffic served over licensed spectrum. According to disclosed aspects, traffic volume for different cells or RATs may be determined and reported by an access node and/or a node of a core network.

For example, one or more wireless connections may be established with a UE using a first cell and a second cell, which may have different cell characteristics. For example, the first cell may operate using a licensed spectrum and the second cell may operate using an unlicensed or authorized shared spectrum. In another example, the first cell may operate using a WWAN (e.g., LTE) RAT and the second cell may operate using a WLAN (e.g., Wi-Fi) RAT. The cell characteristics of the first and second cells may be, but are not limited to, one or a combination of multiple of: primary/secondary cells or primary/secondary sets of cells; frequency bands at which different cells operate; cells that operate using licensed/unlicensed spectrum; cells that operate using licensed/authorized shared spectrum, or a RAT used the cells (e.g., E-UTRAN, WLAN, GERAN. UTRAN, etc.).

A first traffic volume for the UE may be determined based on traffic served over the first cell, and a second traffic volume for the UE may be determined based on traffic served over the second cell. The first cell and the second cell may be associated with a same access node, such as an eNodeB, or with different access nodes, such as an eNodeB and an access point (AP). One or both of the first traffic volume and the second traffic volume may be reported to another node, such as a serving gateway (S-GW) or a packet data network gateway (P-GW). The first traffic volume and the second traffic volume may be associated with a same stream of traffic in which different portions of the stream of traffic are served over the first cell and the second cell. In another example, the first traffic volume and the second traffic volume may be associated with different stream of traffic in which a first stream of traffic may be served over the first cell and a second stream of traffic may be served over the second cell. A charging data record (CDR) may be generated based on the first traffic volume and the second traffic volume. Traffic served over the first cell then may be charged at a different rate that traffic served over the second cell.

In some examples, a network element in a wireless communications network, may receive a first traffic volume and a second traffic volume for a UE, and generate a charging data record based on the first traffic volume and the second traffic volume. The first traffic volume and the second traffic volume may be received, for example, from an access node that serves both a first wireless connection between a first cell and the UE and a second wireless connection between a second cell and the UE. The first traffic volume may indicate an amount of traffic served over the first wireless connection, and the second traffic volume may indicate an amount of traffic served over the second wireless connection. In an example, the first traffic volume and the second traffic volume may be received from the same access node or different access nodes, with the first traffic volume and the second traffic volume being associated with a same stream of traffic. In another example, the first traffic volume and the second traffic volume may be associated with different stream of traffic served by the same access node or different access nodes.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

As used in the present description and the appended claims, the term "wireless wide area network" or "WWAN" refers to a cellular wireless network. Examples of WWANs include, for example, LTE networks, UMTS networks, CDMA2000 networks, GSM/EDGE networks, 1x/EV-DO networks, and the like. In certain examples, a WWAN may be referred to as a "radio access network."

As used in the present description and the appended claims, the term "wireless local area network" or "WLAN" refers to a non-cellular wireless network. Examples of WLANs include, for example, wireless networks conforming to the IEEE 802.11 ("Wi-Fi") family of standards that may transmit using unlicensed spectrum in the 5 GHz band according to established rules for access to the unlicensed spectrum.

Referring first to FIG. 1, a diagram illustrates an example of a wireless communications system 100, in accordance with aspects of the present disclosure. The wireless communications system 100 includes a plurality of access points (e.g., base stations, eNBs, or WLAN access points) 105, a number of user equipment (UEs) 115, and a core network 130. Access points 105 may also be referred to as access nodes, cells, base stations, and/or eNBs, as used herein.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 (also referred to as an Evolved Packet Core (EPC)) through backhaul links 132. In some examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some examples, the wireless communications system 100 is an LTE/LTE-A communications system (or network) that supports one or more modes of operation or deployment scenarios over an unlicensed spectrum, and may employ coordinated contention-based channel access procedures among access points 105 and UEs 115. In some examples, the wireless communications system 100 may support wireless communications using an unlicensed spectrum and an access technology different from LTE/LTE-A. In LTE/LTE-A network communication systems, the terms evolved Node B (eNodeB) may be used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A pico cell may cover a relatively smaller geographic area and may allow unrestricted access by UEs 115 with service subscriptions with the network provider. A femto cell may also cover a relatively small geographic area (e.g., a home) and, in addition to unrestricted access, may also provide restricted access by UEs 115 having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNodeBs or other access points 105 via a backhaul links 132 (e.g., 51 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, pico eNodeBs, femto eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The downlink transmissions may be made using a licensed spectrum, an unlicensed spectrum, an authorized shared spectrum, or combinations thereof. Similarly, the uplink transmissions may be made using a licensed spectrum, an unlicensed spectrum, an authorized shared spectrum, or combinations thereof.

In some examples of the wireless communications system 100, various deployment scenarios using unlicensed spectrum may be supported including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a stand-alone mode in which LTE downlink and uplink communications between a base station (e.g., eNB) and a UE may take place in an unlicensed spectrum. Each of the different modes may operate according to frequency division duplexing (FDD) or time division duplexing (TDD). OFDMA communications signals may be used in the communication links 125 for LTE downlink transmissions in an unlicensed and/or a licensed spectrum, while SC-FDMA communications signals may be used in the communication links 125 for LTE uplink transmissions in an unlicensed and/or a licensed spectrum. Transmissions using the unlicensed spectrum may be carried using one or more carrier frequencies in a frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In many deployments, as mentioned above, an operator seeking to transmit using licensed and/or unlicensed spectrum, and/or using different radio access technologies (e.g., LTE and WLAN) may charge users differently based on the spectrum or technology used to serve traffic to a UE 115. In some deployments, a UE 115 may be configured to access two different cells at once, such as a primary cell and a secondary cell, with traffic served by the different cells having different charge rates. According to various examples, traffic volume for different cells may be determined and reported by an access point 105, and used to determine appropriate charges. The cell characteristics of the different cells may be, but are not limited to, one or a combination of: primary/secondary cells or primary/secondary sets of cells; frequency bands at which different cells operate; cells that operate using licensed/unlicensed spectrum; cell that operate using licensed/authorized shared spectrum, or a RAT used the cells (e.g., E-UTRAN, WLAN, GERAN, UTRAN, etc.).

Figure 2:
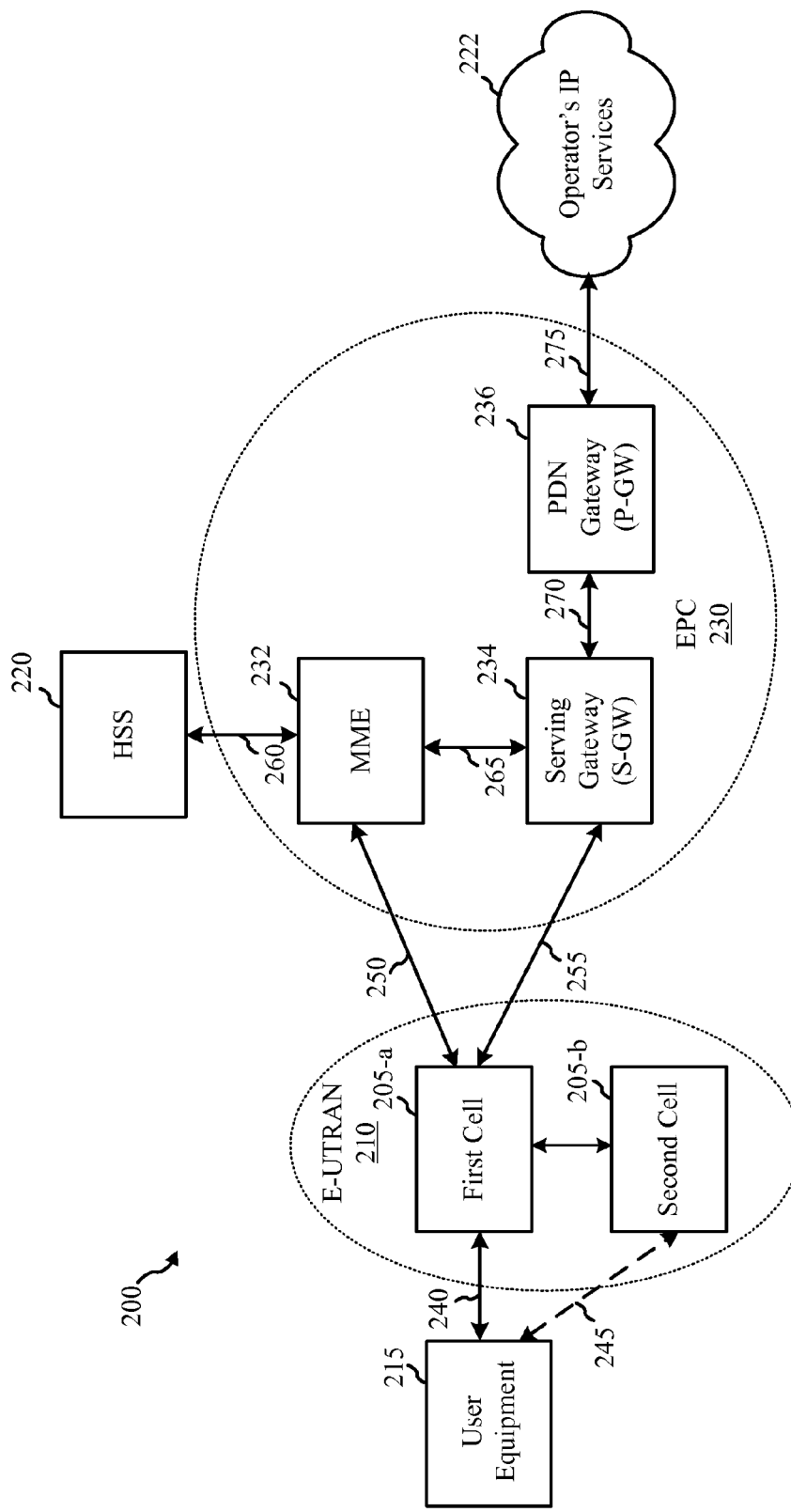
FIG. 2 shows a diagram illustrating an LTE/LTE-A/WLAN network architecture that may determine traffic volumes served over different cells, in accordance with aspects of the present disclosure.

FIG. 2 shows a diagram illustrating an LTE/LTE-A/WLAN network architecture 200 that may determine traffic volumes served over different cells, in accordance with aspects of the present disclosure. The LTE/LTE-A/WLAN network architecture 200 may include one or more UEs 215, an Evolved UMTS Terrestrial Radio Access Network (E-UTRAN) 210, an Evolved Packet Core (EPC) 230, a Home Subscriber Server (HSS) 220, and an Operator's IP Services 222. The network architecture 200 may interconnect with other access networks, but for simplicity those entities/interfaces are not shown. As shown, the network architecture 200 provides packet-switched services, however, as those skilled in the art will readily appreciate, the various concepts presented throughout this disclosure may be extended to networks providing circuit-switched services.

The E-UTRAN 210 may include a first cell 205-*a* and a second cell 205-*b*. In some examples, each of the first cell 205-*a* and second cell 205-*b* may be eNodeB access points connected by an X2 interface. In other examples, the first cell 205-*a* and second cell 205-*b* may be different cells that are operated by a single eNodeB access point. In still further examples, the first cell 205-*a* and second cell 205-*b* may operate according to different RATs and be collocated at a same physical location or non-collocated at different locations. UE 215 may be configured for access to the first cell 205-*a* and second cell 205-*b*. In some examples, the first cell 205-*a* and second cell 205-*b* may be collocated at an eNB, and the first cell 205-*a* may provide access using licensed, and the second cell 205-*b* may provide access using unlicensed spectrum. In other examples, the first cell 205-*a* may provide WWAN RAT access and the second cell may provide WLAN RAT access. In further examples, the first cell 205-*a* may provide LTE access and the second cell 205-*b* may provide LTE Authorized Shared Access (ASA).

LTE ASA, used in some examples, may allow different operators to access the underutilized spectrum on a shared basis without interfering with incumbent spectrum holders. While some specific examples are listed here, it will be readily understood that other cell characteristics may be used in various examples, such as frequency bands at which different cells 205 operate; cells 205 that operate using licensed/unlicensed/authorized shared spectrum; or a RAT used the cells 205 (e.g., E-UTRAN, WLAN, GERAN. UTRAN, etc.).

As mentioned above, in some examples operators may desire to have different charging models for serving the UE 215 on the first cell 205-*a* and the second cell 205-*b*. According to some examples, and as will be described in more detail below, the first cell 205-*a* may account for a number of packets transmitted over the first cell 205-*a* and the second cell 205-*b*. Such accounting may be performed for both downlink and uplink separately, in some examples. In some examples, the existence of the second cell 205-*b* may be transparent to the EPC 230, and all traffic served by the first cell 205-*a* and second cell 205-*b* may be exchanged on a single connection 255, such as a S1-U interface for example, with the EPC 230.

The first cell 205-*a* may provide user and control plane protocol terminations toward the UE 215. The first cell 205-*a* may provide an access point to the EPC 230 for the UE 215, and may provide a first wireless connection 240 with the UE 215. The first cell 205-*a* may be connected by an S1-MME interface 250 to one or more Mobility Management Entities (MMEs) 232 of the EPC 230. Additionally or alternatively, the first cell 205-*a* may be connected by an S1-U interface 255 to one or more Serving Gateways 234 of the EPC 230. The MME 232 may be coupled with the S-GW 234 via interface 265, which may be an S11 interface. The S-GW 234 may be coupled with one or more Packet Data Network (PDN) Gateways (P-GWs) 236 via interface 270, which may be an S5 interface. The MME 232, among other functions, may provide bearer and connection management, and may verify UE 215 credentials with HSS 220 via interface 260, which may be a S6a interface. The P-GW 236 may provide UE IP address allocation as well as other functions. The P-GW 236 may be connected to the Operator's IP Services 222 via interface 275, which may be a SGi interface. The Operator's IP Services 222 may include, for example, the Internet, an Intranet, an IP Multimedia Subsystem (IMS), and a Packet-Switched (PS) Streaming Service (PSS).

As indicated above, in some examples operators may desire to have different charging models for serving the UE 215 on the first cell 205-*a* and the second cell 205-*b*. According to some examples, accounting mechanisms for charging may be performed in the EPC 230. For example, in some examples both the S-GW 234 and P-GW 236 may be able to collect and report accounting information for each UE 215 for each cell 205. Such accounting information may include, for example, an amount of data transmitted in uplink and downlink direction categorized with a Quality of Service (QoS) Class Identifier (QCI) and Allocation and Retention Priority (ARP) pair per UE per PDN connection. In some examples, the accounting information may be collected and reported per bearer.

Accounting information such as described above may be reported by creating a Charging Data Record (CDR), and the data provided by S-GW 234 and/or P-GW 236 may be correlated in a Charging Gateway Function (CGF), via a Charging ID which is assigned to UE 215 by P-GW 236. The P-GW 236 may collect the same information and take actions per Service Data Flow (SDF) by the addition of Policy and Charging Enforcement Function (PCEF) functionality, based on instructions from a Policy and Charging Rules Function (PCRF). A CDR may include, in some examples, data volume per cell, time, and/or user location information. In examples where S-GW 234 provides a CDR, the data volume may be provided on a per cell and/or per bearer basis such as per IP-Connectivity Access Network (IP-CAN) bearer. In examples where P-GW 236 provides a CDR, the data volume may be provided on a per cell, per bearer and/or SDF basis. In some examples, user location information may be provided in the CDR if the cell 205 and/or MME 232 are capable of providing this information.

As mentioned above, a CDR may be created, modified, and/or closed by the S-GW 234. A S-GW 234 CDR may be used to collect charging information on a per bearer basis for UE 215. A S-GW 234 CDR may include, for example, bearer specific container reporting the usage and authorized QCI/ARP for a bearer, and bearer specific container(s). In an example, S-GW 234 CDR may be created at an activation of IP-CAN bearer and an IP-CAN bearer specific container may be generated based at least in part on charging conditions. When a change of charging condition occurs, traffic volume counts may be added to the CDR by the S-GW 234 and/or new counts may be started. The SGW 324 CDR may include details such as Record Type, Served IMSI, and/or Sequence Number, to name a few examples. Not all of the charging information to be collected may be static, and other charging information may directly dependent on dynamic Packet-Switched service usage. The Tables 1 and 2 identify conditions for adding information to, and closing the S-GW 234 CDR for generation towards the CGF, according to various examples.

TABLE 1

Triggers for SGW-CDR charging information addition

| Trigger Conditions | Description/Behaviour |
|---|---|
| QoS Change | A change in the QoS shall result that open "List of Traffic Data Volumes" containers being closed and added to the CDR and new IP-CAN bearer specific container is opened. |
| Tariff Time Change | On reaching the Tariff Time Change open "List of Traffic Data Volumes" containers shall be closed and added to the CDR. |
| User Location Change | A change in the User Location Info (e.g. ECGI, TAI, RAI, SAI or CGI) shall result that open "List of Traffic Data Volumes" containers being closed and added to the CDR, if location reporting is required, and a report of User Location Change is received. |
| User CSG Information change | A change in the User CSG info (e.g. CSG ID, access mode or CSG membership indication) shall result that open "List of Traffic Data Volumes" containers being closed and added to the CDR, if CSG information reporting is required, and a report of User CSG information change is received. |
| CDR Closure | Open "List of Traffic Data Volumes" containers shall be closed and added to the SGW-CDR. |

TABLE 2

Triggers for S-GW-CDR closure

| Closure Conditions | Description/Behaviour |
|---|---|
| End of IP-CAN bearer within the S-GW | Deactivation of the IP-CAN bearer in the S-GW shall result in the CDR being closed. The trigger condition covers:<br>termination of IP-CAN bearer;<br>S-GW change;<br>any abnormal release. |
| Partial Record Reason | O&M reasons permit the closure of the CDR for internal reasons. The trigger condition covers:<br>data volume limit;<br>time (duration) limit;<br>maximum number of charging condition changes (QoS/tariff time change);<br>management intervention;<br>MS time zone change;<br>PLMN change;<br>radio access technology change (RAT Type). |

As also mentioned above, a CDR also may be created, modified, and/or closed by the P-GW 236. A P-GW 236 CDR may be used to collect charging information related to IP-CAN bearer data information per cell 205 for a UE 215 in the P-GW 236, where the data volumes, elapsed time, and/or number of events within each P-GW 236 CDR may be separately counted per rating group or per combination of the rating group and service ID. According to some examples, a plurality of service data flow (SDF) containers per IP-CAN bearer may be active simultaneously in a P-GW 236 CDR. A service data flow container may be activated when traffic is detected and no matching active service data flow container is identified, and a service data flow container may be closed when the termination of the last service data flow matching to the service data flow container is detected by the P-GW 236. When event based charging applies, the first occurrence of an event matching a service data flow template may imply a service data flow start.

If, according to a charging characteristics profile, CDR generation is activated at P-GW 236, an PGW-CDR may be opened at IP-CAN bearer activation, and the traffic volume (separately in uplink and downlink direction, per cell), elapsed time and/or number of events may be counted. When a change of charging condition occurs, containers added to the PGW-CDR. The PGW-CDR may include details such as Record Type, Served IMSI, Sequence Number etc. and the FBC specific charging data. Again, not all of the charging information to be collected may be static, and other charging information may be directly dependent on dynamic Packet-Switched service usage. Tables 3 and 4 identify conditions for adding information to, and closing the P-GW 236 CDR for generation towards the CGF, according to various examples.

TABLE 3

Triggers for PGW-CDR charging information addition "List of Service Data"

| Trigger Conditions | Description/Behaviour |
|---|---|
| IP-CAN bearer modification | A change of IP-CAN bearer conditions (e.g. QoS change, SGSN/S-GW/ePDG change, user location change, user CSG information change) shall result in a set of "List of Service Data" containers, i.e. all active service data flow containers, being added to the CDR as described in clause 5.2.1.3.<br>In a tight interworking between online and offline charging the specified quota re-authorisation triggers armed by OCS are supported. |
| Tariff Time Change | On reaching the Tariff Time Change a set of "List of Service Data" containers, i.e. all active service data flow containers, shall be added to the CDR.<br>In a tight interworking between online and offline charging the DCCA tariff time change from OCS is supported. |
| DCCA Failure-Handling procedure triggering | When the Diameter Credit-Control-Failure-Handling mechanism is triggered a 'List of Service Data', i.e. all active service data flow containers shall be added to the CDR.<br>The causes are only relevant in case of simultaneously usage of an active DCCA session. |
| Service data flow report | In case of independent online and offline charging a "List of Service Data" container for the service data flow shall be added when:<br>expiry of time limit;<br>expiry of volume limit;<br>expiry of unit limit;<br>termination of service data flow.<br>In case of tight interworking online and offline charging a "List of Service Data" container for the service data flow shall be added when:<br>time threshold reached;<br>volume threshold reached;<br>unit threshold reached;<br>time quota exhausted;<br>volume quota exhausted;<br>unit quota exhausted;<br>expiry of quota validity time;<br>termination of service data flow:<br>re-authorization request by OCS. |
| CDR Closure | All active "List of Service Data" containers shall be added to the PGW-CDR<br>Note: The trigger condition is a common value that has to be used for CDR closure together with detailed reason. |

TABLE 4

Triggers for PGW-CDR closure

| Closure Conditions | Description/Behaviour |
|---|---|
| End of IP-CAN bearer within the P-GW | Deactivation of the IP-CAN bearer in the P-GW shall result in the CDR being closed.<br>The trigger condition covers:<br>termination of IP-CAN bearer;<br>any abnormal release. |
| Partial Record Reason | O&M reasons permit the closure of the CDR for internal reasons. The trigger condition covers:<br>data volume limit;<br>time (duration) limit;<br>maximum number of charging condition changes (i.e. number of service containers);<br>management intervention;<br>MS time zone change;<br>PLMN change;<br>radio access technology change (RAT Type). |

Figure 3:
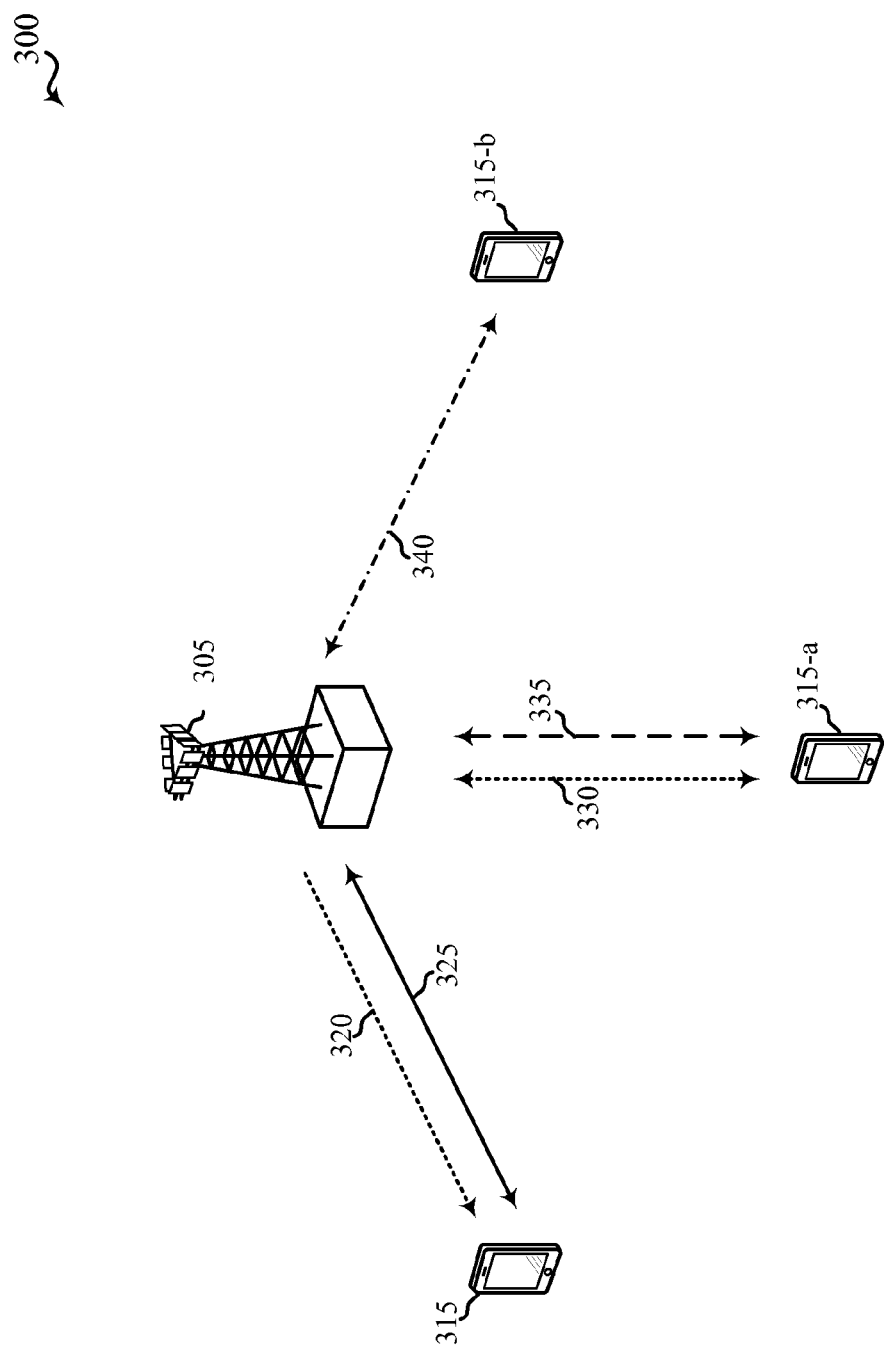
FIG. 3 is a block diagram conceptually illustrating examples of deployment scenarios for using LTE in an unlicensed spectrum, in accordance with aspects of the present disclosure.

FIG. 3 is a block diagram conceptually illustrating examples of deployment scenarios for using LTE in an unlicensed spectrum, in accordance with aspects of the present disclosure. A wireless communications system 300 illustrates examples of a supplemental downlink mode, a carrier aggregation mode, and a stand-alone mode, for between an eNB 305 and UEs 315 in an LTE network that supports unlicensed spectrum. The wireless communications system 300 may be an example of portions of the wireless communications systems 100 and/or network architecture 200 described with reference to FIGS. 1 and/or 2. Moreover, the eNB 305 may be an example of one of the access points and/or cells 105 of FIGS. 1 and/or 2, while the UEs 315 may be examples of the UEs 115 and/or 215 described with reference to FIGS. 1 and/or 2.

In the example of a supplemental downlink (SDL) mode in wireless communications system 300, using a first cell, the eNB 305 may transmit OFDMA communications signals to the UE 315 using a bidirectional link 325 and may receive SC-FDMA communications signals from that UE 315 using the bidirectional link 325. The bidirectional link 325 may be associated with a frequency in a licensed spectrum. At the same time, the eNB 305 may transmit OFDMA communications signals to a UE 315 using downlink 320 from a second cell of eNB 305. In the example of FIG. 3, downlink 320 may be associated with a frequency in an unlicensed spectrum. The downlink 320 in the unlicensed spectrum and the bidirectional link 325 in the licensed spectrum may operate concurrently. The downlink 320 may provide a downlink capacity offload for the eNB 305. In some examples, the downlink 320 may be used for unicast services (e.g., addressed to one UE) or for multicast services (e.g., addressed to several UEs). This scenario may occur with any service provider (e.g., a traditional mobile network operator or MNO) that uses a licensed spectrum and needs to relieve some of the traffic and/or signaling congestion. As mentioned above, the service provider may charge differently for traffic transmitted using downlink 320 and bidirectional link 325.

In one example of a carrier aggregation (CA) mode in wireless communications system 300, a first cell associated with the eNB 305 may transmit OFDMA communications signals to UE 315-*a* using a bidirectional link 335 and may receive SC-FDMA communications signals from the same UE 315-*a* using the bidirectional link 335. The bidirectional link 335 may be associated with a frequency in a licensed spectrum. Concurrently, a second cell associated with the eNB 305 may transmit OFDMA communications signals to a UE 315-*a* using a bidirectional link 330 and may receive SC-FDMA communications signals from the same UE 315-*a* using the bidirectional link 330. In the example of FIG. 3, bidirectional link 330 may be associated with a frequency in an unlicensed spectrum. The bidirectional link 330 may provide a downlink and uplink capacity offload for the eNB 305. Like the supplemental downlink described above, this scenario may occur with any service provider (e.g., a mobile network operator (MNO)) that uses a licensed spectrum needs to relieve some of the traffic and/or signaling congestion. As mentioned above, the service provider may charge differently for traffic transmitted using bidirectional link 330 and bidirectional link 335.

In an example of a stand-alone (SA) mode in wireless communications system 300, the eNB 305 may transmit OFDMA communications signals to a UE 315-*b* using a bidirectional link 340 and may receive SC-FDMA communications signals from the same UE 315-*b* using the bidirectional link 340 which may be associated with a frequency in an unlicensed spectrum. The bidirectional link 340 may provide a downlink and uplink capacity offload for the eNB 305. This example and those provided above are presented for illustrative purposes and there may be other similar modes of operation or deployment scenarios that combine licensed spectrum and unlicensed spectrum for capacity offload. The service provider may charge differently for traffic transmitted using bidirectional link 340 than for traffic transmitted using another RAT or data transmitted using licensed spectrum.

As described above, a service provider that may benefit from the capacity offload offered by using unlicensed spectrum (e.g., LTE communications in an unlicensed band) may be a traditional MNO with licensed spectrum. For these service providers, an operational example may include a bootstrapped mode (e.g., supplemental downlink, carrier aggregation) that uses the primary component carrier (PCC) on the licensed spectrum and the secondary component carrier (SCC) on the unlicensed spectrum.

In the SDL mode, control for the unlicensed spectrum may be transported over the LTE uplink (e.g., uplink portion of the bidirectional link 325) in the licensed spectrum. One of the reasons to provide downlink capacity offload is because data demand may be largely driven by downlink consumption. Moreover, in this mode, there may be reduced regulatory impact since the UE 315 is not transmitting in the unlicensed spectrum. According to some examples, a volume of signaling data (e.g., radio resource control (RRC) traffic volumes, network access stratum (NAS) signaling traffic volumes, and control channel physical signaling traffic volumes) may be provided to a charging function, and the service provider may charge differently for signaling traffic volume and data traffic volume transmitted using bidirectional link 340.

In the CA mode, data and signaling data (e.g., RRC data, NAS signaling data, and control channel physical signaling traffic) may be communicated in LTE (e.g., bidirectional link 335) using licensed spectrum while data may be communicated (e.g., bidirectional link 330) using unlicensed spectrum. According to some examples, a volume of data and signaling data associated with bidirectional link 335 may be may be provided to a charging function, and a volume of data associated with bidirectional link 330 may be provided to the charging function. The carrier aggregation mechanisms supported when using unlicensed spectrum may fall under a hybrid frequency division duplexing-time division duplexing (FDD-TDD) carrier aggregation or a TDD-TDD carrier aggregation with different symmetry across component carriers.

Figure 4:
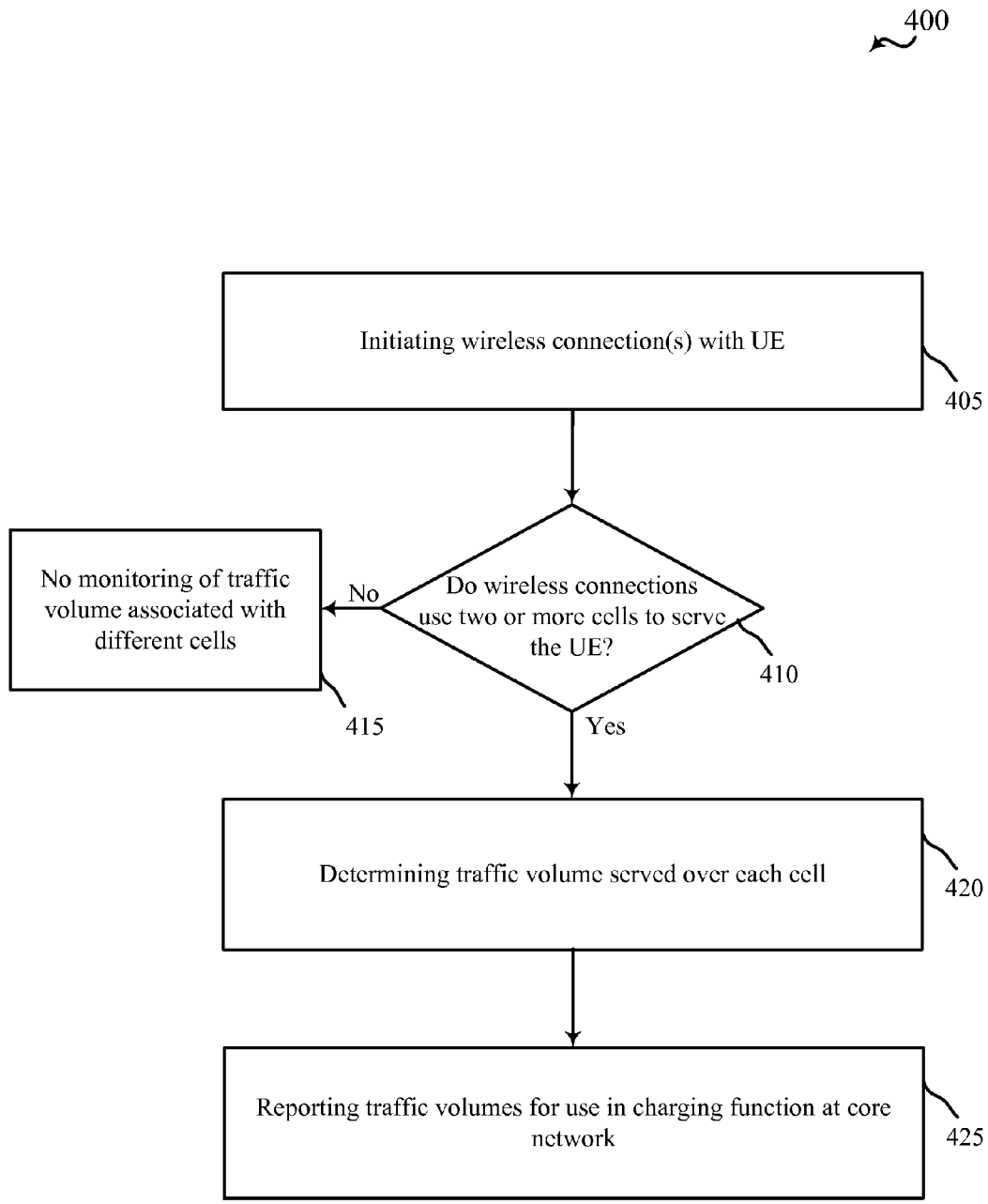
FIG. 4 is a block diagram conceptually illustrating examples of deployment scenarios for using LTE in an unlicensed spectrum, in accordance with aspects of the present disclosure.

As discussed, above, operators may charge different rates for traffic served by different cells in a wireless communications system. FIG. 4 is a block diagram conceptually illustrating examples of deployment scenarios for using LTE in an unlicensed spectrum, in accordance with aspects of the present disclosure. Method 400 is described with reference to ones of the access points 105, cells 205 and/or eNBs 305 and/or aspects of the core network 130, 230 (e.g., S-GW 234 and/or P-GW 236) described with reference to FIGS. 1, 2 and/or 3. In examples, an access node or core network element may execute one or more sets of codes to control the functional elements of the device to perform the functions described below. Initially, one or more wireless connections are initiated with a UE, as indicated at block 405. The wireless connections may be established responsive to this initiation by establishing one or more air interfaces between the UE and an eNB, for example. At block 410, it is determined if two or more cells are being used to serve traffic to the UE. If two or more cells are not being used to service the UE, monitoring of traffic volume associated with different cells may not be performed, as noted at block 415. In such cases, CDR generated by S-GW and/or P-GW may capture the information needed in order to properly charge for the served traffic without information related to volumes of traffic served using different cells.

If it is determined at block 410 that two or more cells are being used to serve a UE, a determination is made of a traffic volume that is served over at least one of the two or more cells, as indicated at block 420. According to various examples, accounting of traffic volume over different cells for both uplink and downlink may be supported at least per radio bearer (i.e., per GTP tunnel). In examples where charging per SDF is performed at the P-GW, the access node may account traffic volume per SDF, and in such examples the access node may receive the information of SDF in order to provide an account of data volume per SDF. Such SDF information may be provided, for example, via direct configuration when the bearer is set up. In such examples, the SDF(s) information associated with the bearer may be included in the bearer setup message forwarded by the MME. In other examples, SDF information may be provided via user plane packet marking performed at the P-GW. In such examples, in the downlink, the P-GW may include in each packet header a certain identifier of the traffic flow, and the access node may add this identifier to an accounting table. In the uplink the access node may takes the source/destination IP address and transport layer port (5-tuple) in the downlink packets and create a table with data flow identifier (e.g., greater than 5-tuple), and match the uplink packet with one of the 5-tuples to identify the correct data flow identifier; or the access node may mark uplink packets with the bytes transmitted over each of the different cells. Per SDF based accounting for uplink may then be performed at the P-GW, and the access node would still perform accounting in the downlink per radio bearer.

The accounting of traffic volumes may be initiated based on one or more of when a new radio bearer or RRC connection is established for the UE, a modification of an existing radio bearer occurs, upon deactivation of an existing radio bearer, at a mobility event for the UE, or when a traffic volume exceeds a threshold, according to some examples. Such initiation may be triggered, for example, by a RRC-IDLE to RRC-CONNECTED transition, such as a service request procedure, attach procedure, and/or tracking area update procedure. Initiation also may be triggered, for example, by a handover procedure. Following initiation of accounting of traffic volumes, the access node may add entries into the traffic volume record whenever, for example, a new radio bearer is activated, a radio bearer is modified (e.g., a QoS of the bearer is modified), a new SDF is provided (if SDF based accounting applies), and/or a new secondary cell is activated or deactivated. Additionally, the access point may also perform accounting of signaling volume over the control plane, as mentioned above. According to some examples, one or more of the reported traffic volumes may include traffic volume associated with one or more of an Access Point Name (APN), a default data bearer, a dedicated data bearer, an IP flow, or a TCP connection. Traffic volumes may include, for example, data traffic volumes or signaling traffic volumes. Signaling traffic volumes may include, for example, radio resource control (RRC) traffic volumes, network access stratum (NAS) signaling traffic volumes, and control channel physical signaling traffic volumes.

At block 425, traffic volumes for at least one of the two or more cells are reported for use in a charging function at the core network. For example, an eNB, may report traffic volumes to a MME, P-GW, and/or S-GW, which may be used to create a CDR. According to various examples, both the S-GW CDR and P-GW CDR may be extended to include explicit account for data volumes over different cells used to serve data traffic and/or signaling traffic volumes. In some examples, an access point, such as access points 105 may support functionalities to provide separate accounting of data volume transmitted over different cells. Such data volume may include IP layer packets, and may not include, for example, the RLC or PDCP headers added by the medium access control (MAC) layer to enable in-order delivery and fragmentation and reassembly. In some examples, signaling traffic volume data may be provided by a first or primary cell, while data traffic volumes may be provided by the first cell and/or one or more other cells.

Access nodes may include one of a number of different reporting mechanisms. For example, an access node may report traffic volumes served via the first and second cells to the S-GW over control plane signaling via an MME. The S-GW may then relay this information to the P-GW, according to some examples. The S-GW CDR and P-GW CDR may include an explicit account for traffic volumes over different cells. In other examples, the access node may report traffic volumes served over different cells to the S-GW directly over S1-U interface. For example, an access node may report data volumes in a GTP-U tunnel as part of one or more header extensions for the bearer, or in separate GTP-C messages. The S-GW may relay this information to the P-GW, and the S-GW CDR and P-GW CDR may include explicit account for data volumes over first and second cells. In further examples, an access node may report data volumes of different cells directly to a Charging Gateway Function (CGF) via the creation of an access node CDR (e.g., an eNB CDR), or to the Charging Data Function (CDF) if the CGF is not created in the access node. The CGF of the core network, or any other billing entity, may then correlate S-GW CDR, P-GW CDR and/or eNB CDR.

As mentioned above, reporting of data volumes may be provided to S-GW via the MME according to some examples. As noted above, the S-GW/P-GW may support triggers for addition of new record based on a UE's ULI change and QoS change, and may close a record based on bearer deactivation. In some examples, reporting of traffic volume information may be provided when the UE moves to RRC-IDLE, during handover procedure, and during bearer modification procedures. In other examples, such as examples that may use online charging and dynamic policying, such information may be provided to S-GW/P-GW in a periodic manner.

Figure 5:
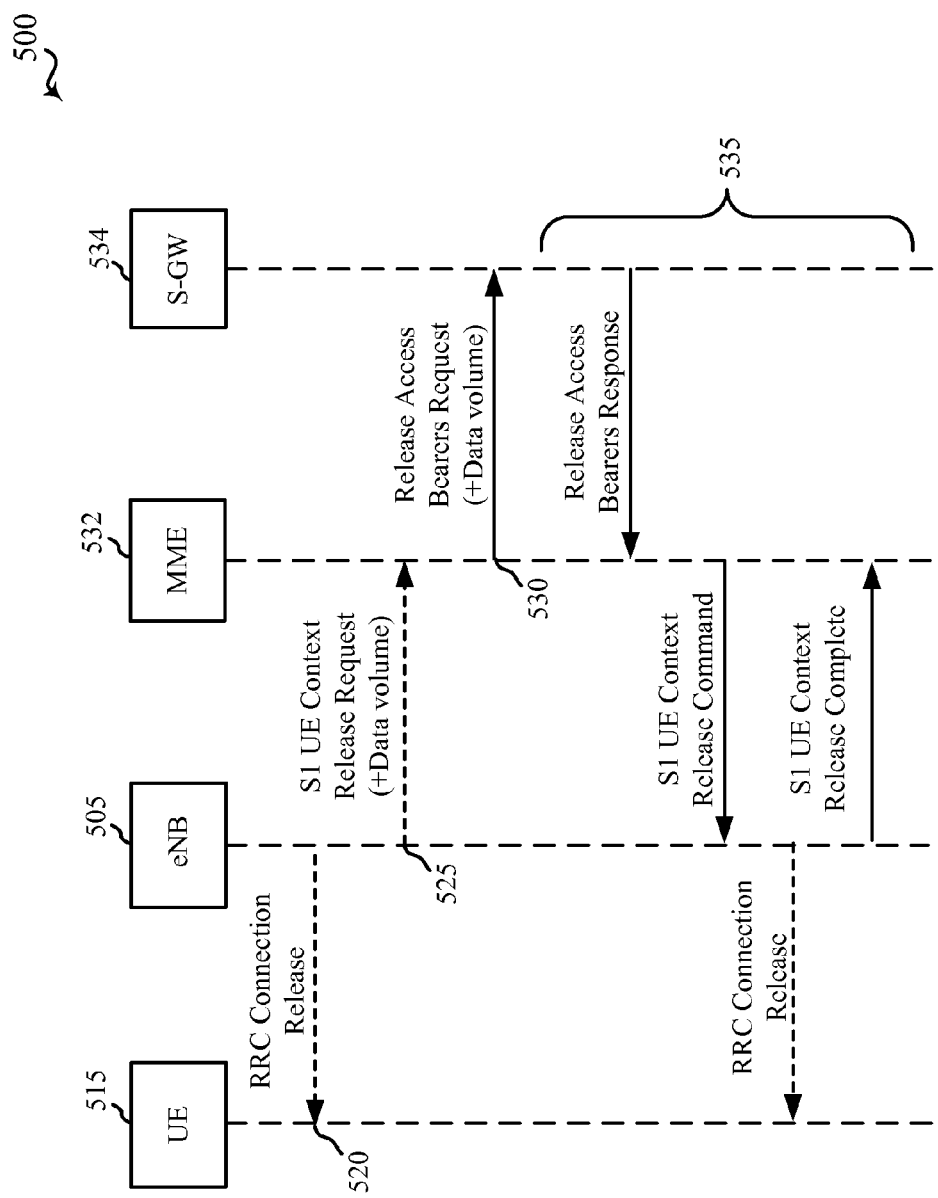
FIG. 5 is a flow diagram illustrating exemplary operations for transmitting traffic volume information, in accordance with aspects of the present disclosure.

FIG. 5 is a flow diagram 500 illustrating exemplary operations for transmitting traffic volume information, in accordance with aspects of the present disclosure. Traffic volume in some examples may be reported during an S1-release, according to flow diagram 500. The S1 release procedure may release a UE from an RRC-Connected state to an RRC-idle state. In this example, a UE 515 may receive an RRC connection release message 520 from eNB 505. The UE 515 may be an example of UEs 115, 215, and/or 315 of FIGS. 1, 2, and/or 3, for example. The eNB 505 may be an example of access points 105, cells 205, and/or eNBs 305 of FIGS. 1, 2, and/or 3, for example. The eNB 505 may then transmit (via the S1 interface) an S1 context release request 525 to MME 532. The MME 532 may be an example of MME 232 of FIG. 2, for example. According to some examples, the S1 context release message may include a "Traffic Volume Record" information element in the S1 UE Context Release Request message. The traffic volume record may include, for example, traffic volumes of traffic served over different cells, a RAT associated with each cell, an indication of whether each cell uses licensed, unlicensed or authorized shared spectrum, an identity of each cell, a timestamp of the report, and/or radio bearer characteristics for each radio bearer associated with the cells.

The MME 532 may then transmit a release access bearers request 530 to S-GW 534. S-GW may be an example of S-GW 234 of FIG. 2, for example. According to some examples, the release access bearers request 530 may also include the Data Volume Record information element that the MME 532 received from eNB 505. The S-GW 534, uses the received information to modify the S-GW 524 CDR, and, in some examples, may include the same Data Volume Record information element in a Release Access Bearers Request message to a P-GW (such as P-GW 236 of FIG. 2). This information may be used at the P-GW to modify the PGW CDR accordingly. The remaining steps of the S1-release are indicated at 535, and correspond to established S1 release messages transferred between the UE 515, eNB 505, MME 532, and S-GW 534.

Figure 6A:
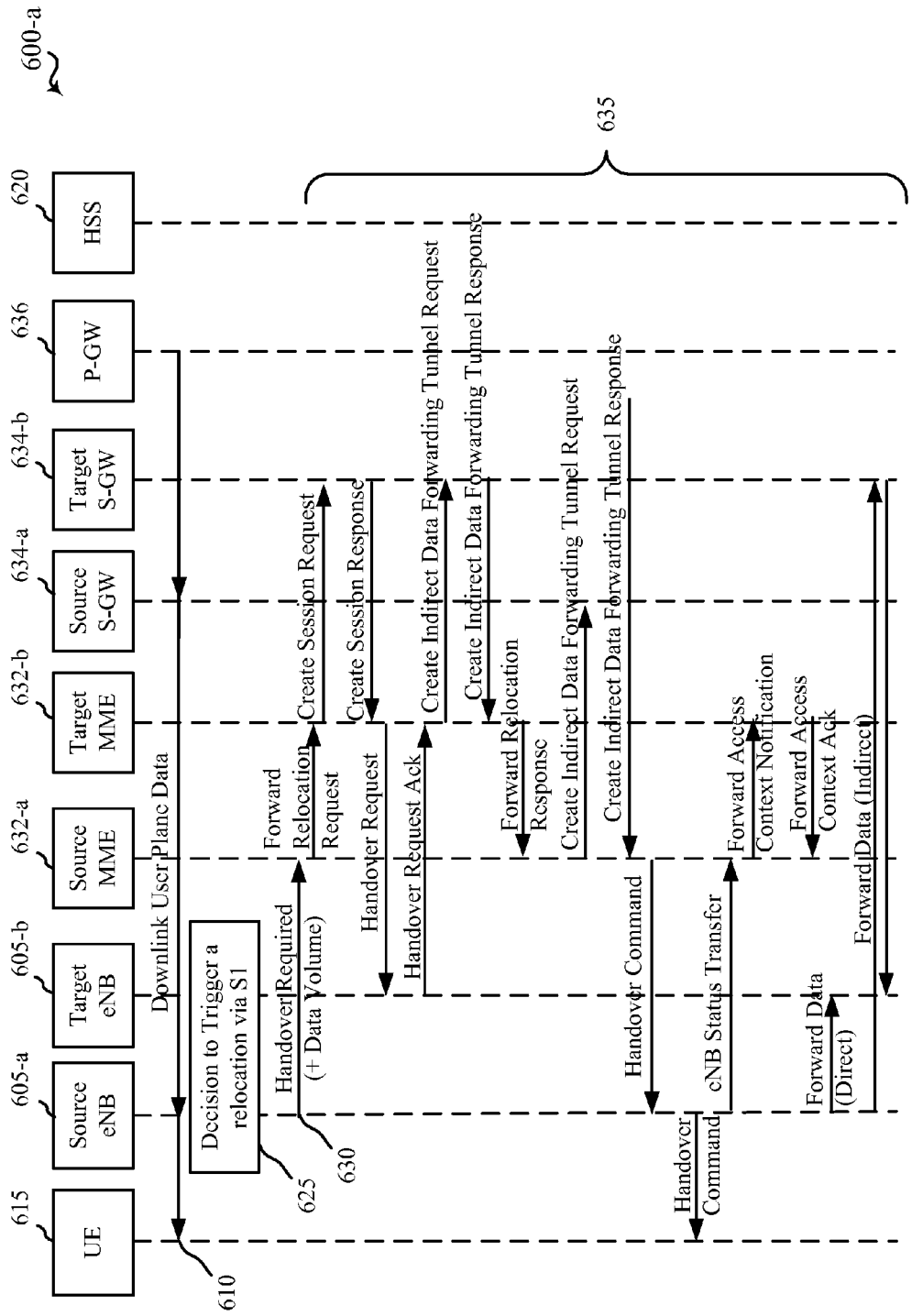
FIGS. 6A and 6B are flow diagrams illustrating exemplary operations for transmitting traffic volume information, in accordance with aspects of the present disclosure.
Figure 6B:
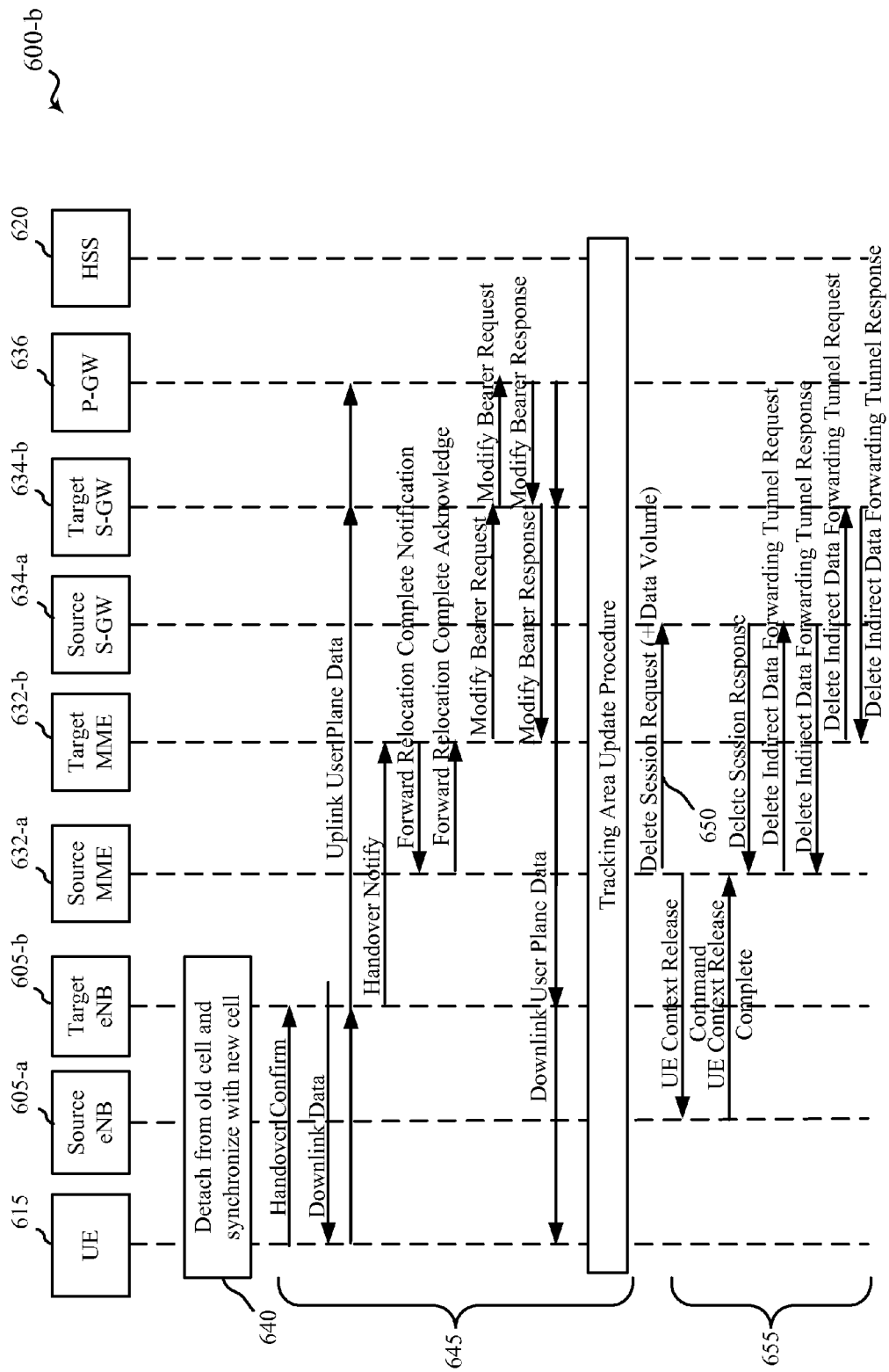

FIGS. 6A and 6B illustrate another flow diagram 600 illustrating exemplary operations for transmitting traffic volume information, in accordance with aspects of the present disclosure. Traffic volume in examples such as illustrated in FIGS. 6A and 6B may be reported during an S1-based handover operation, according to flow diagram 600. The S1-based handover operation may handover a connection to UE 615 from a source eNB 605-*a* to a target eNB 605-*b*. In this example, UE 615 may receive downlink user plane data 610 from a P-GW 636 via a source S-GW 634-*a* and source eNB 605-*a*. The UE 615 may be an example of UEs 115, 215, 315 and/or 515 of FIGS. 1, 2, 3 and/or 5, for example. The source eNB 605-*a* and target eNB 605-*b* may be an examples of access points 105, cell 205, and/or eNB 305 and/or 505 of FIGS. 1, 2, 3 and/or 5, for example. At block 625, the source eNB 605-*a* and target eNB 605-*b* make a decision to trigger a relocation of UE 615 via S1. Source eNB 605-*a* then sends a handover required message 630 to source MME 632-*a*. According to some examples, the handover required message may include a "Traffic Volume Record" information element, similar to the Traffic Volume Record described above with respect to FIG. 5. The traffic volume record is provided to the source MME 632-*a* and may include, for example, volumes of traffic served over different cells, a RAT associated with each cell, an indication of whether each cell uses licensed, unlicensed or authorized shared spectrum, an identity of each cell, a timestamp of the report, and/or radio bearer characteristics for each radio bearer associated with the cells.

Following the handover required message 630, the remaining steps of the S1-based handover operation of FIG. 6A are indicated at 635, and correspond to established S1-based handover messages transferred between one or more of the UE 615, source eNB 605-*a*, target eNB 605-*b*, source MME 632-*a*, target MME 632-*b*, source S-GW 634-*a*, target S-GW 634-*b*, P-GW 636, and HSS 620. The S1-based handover operations continue in FIG. 6B with UE 615 detaching from an old cell of the source eNB 605-*a* and synchronizing with a new cell at target eNB 605-*b*, as indicated at 640. Following operation 640, the steps of the S1-based handover operation of FIG. 6B indicated at 645 correspond to established S1-based handover messages transferred between one or more of the UE 615, source eNB 605-*a*, target eNB 605-*b*, source MME 632-*a*, target MME 632-*b*, source S-GW 634-*a*, target S-GW 634-*b*, P-GW 636, and HSS 620. At operation 650, the source MME 632-*a* sends a delete session request to source S-GW 634-*a*.

According to some examples, the delete session request 650 includes a Traffic Volume Record information element, similar to the Traffic Volume Record described above with respect to FIG. 5. The traffic volume record is provided to the source S-GW 634-*a* and may include, for example, volumes of traffic served over different cells, a RAT associated with each cell, an indication of whether each cell uses licensed, unlicensed or authorized shared spectrum, an identity of each cell, a timestamp of the report, and/or radio bearer characteristics for each radio bearer associated with the cells. Following the delete session request 650, the remaining steps of the S1-based handover operation of FIG. 6B are indicated at 655, and correspond to established S1-based handover messages transferred between the UE 515, source eNB 605-*a*, target eNB 605-*b*, source MME 632-*a*, target MME 632-*b*, source S-GW 634-*a*, target S-GW 634-*b*, P-GW 636, and HSS 620.

In still further examples, an eNB may report of traffic volumes for cells during X2-based handover operations. In some such examples, a target eNB, such as access point 105, cell 205, and/or eNB 305, 505, and/or 605 of FIGS. 1-3 and/or 5-6, reports the handover to network elements of the core network, such as core network 130 or 230 of FIGS. 1 and/or 2, or network elements of FIGS. 5 and/or 6. In some examples, the source eNB may provide a Traffic Volume Record information element (similarly as described above with respect to FIGS. 5 and/or 6) to the target eNB during handover procedure. The target eNB may then forward the Traffic Volume Record to the MME (e.g., MME 232, 532, and/or 632 of FIGS. 2, 5, and/or 6), which may in turn forward the Traffic Volume Record to a source S-GW (e.g., S-GW 234, 534, and/or 634-*a* of FIGS. 2, 5, and/or 6) in a Modify Bearer Request message. The S-GW may then forward the Traffic Volume Record to source P-GW (e.g., P-GW 236, 536, and/or 636-*a* of FIGS. 2, 5, and/or 6) in a Modify Bearer Request message. The source P-GW may generate a CDR, similarly as discussed above.

In some examples, reporting of traffic volume may be triggered by one or more events. For example, reporting of traffic volume may be provided during bearer modification and/or deactivation. In such examples, when a bearer is modified or deactivated, an eNB (e.g., access point 105, cell 205, and/or eNB 305, 505, and/or 605 of FIGS. 1, 2, 3, 5, and/or 6) may report the traffic volumes along with S1-MME signaling to an MME (e.g., MME 232, 532, and/or 632 of FIGS. 2, 5, and/or 6). The MME may then forward this information to S-GW (e.g., S-GW 234, 534, and/or 634-*a* of FIGS. 2, 5, and/or 6), for generation of a CDR, similarly as discussed above.

In further examples, traffic volumes may be reported to a S-GW (e.g., S-GW 234, 534, and/or 634-*a* of FIGS. 2, 5, and/or 6) via an S1-U interface. In such examples, an eNB (e.g., access point 105, cell 205, and/or eNB 305, 505, and/or 605 of FIGS. 1, 2, 3, 5, and/or 6) reports the user plane data volumes (and possibly signaling volume) over different cells to the S-GW via S1-U interface, using GTP-C signaling. Such a report may be trigger driven and/or periodic. In examples where such a report is trigger driven, triggers may include, for example, one or more of radio bearer modification, activation, and/or deactivation; RRC connection release; a mobility event; or an amount of traffic volume exceeding one or more threshold amounts of traffic volume (e.g., per MB). The S-GW may use this information to modify the S-GW CDR and include cell specific traffic volume. The S-GW, in some examples, may also forward the information to a P-GW for creation of a P-GW CDR.

In further examples, traffic volumes may be reported by an eNB (e.g., access point 105, cell 205, and/or eNB 305, 505, and/or 605 of FIGS. 1, 2, 3, 5, and/or 6) directly to a CGF and/or a CDF. In such examples, an eNB may report the traffic volume, and possibly signaling, volumes transmitted over different cells directly to the CGF, or CDF if CDF functionality is outside of the access node. The CGF, or any other billing entity, may correlate information received from one or more S-GW CDR, P-GW CDR, and eNB CDR.

Figure 7A:
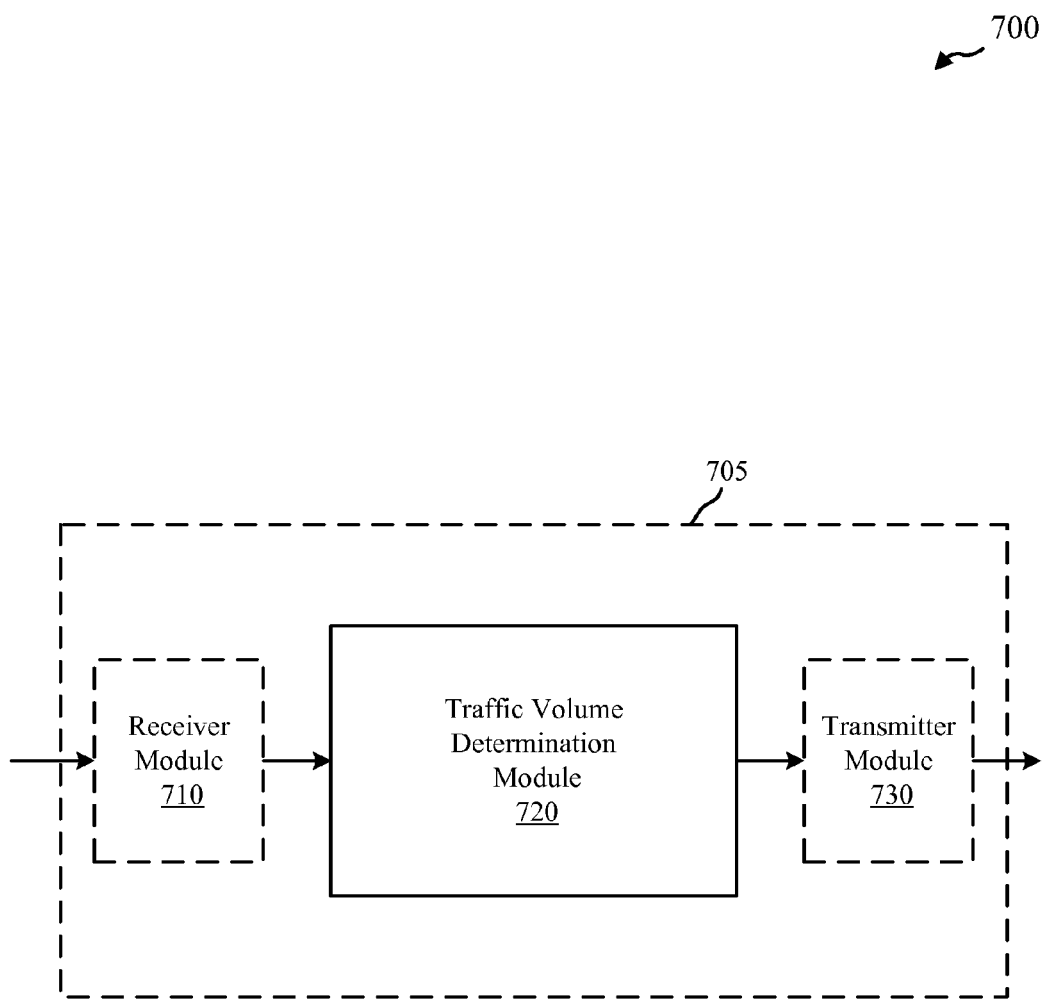
FIGS. 7A and 7B are block diagrams conceptually illustrating devices, such as eNBs or core network elements, for use in traffic volume determination, in accordance with aspects of the present disclosure.
Figure 7B:
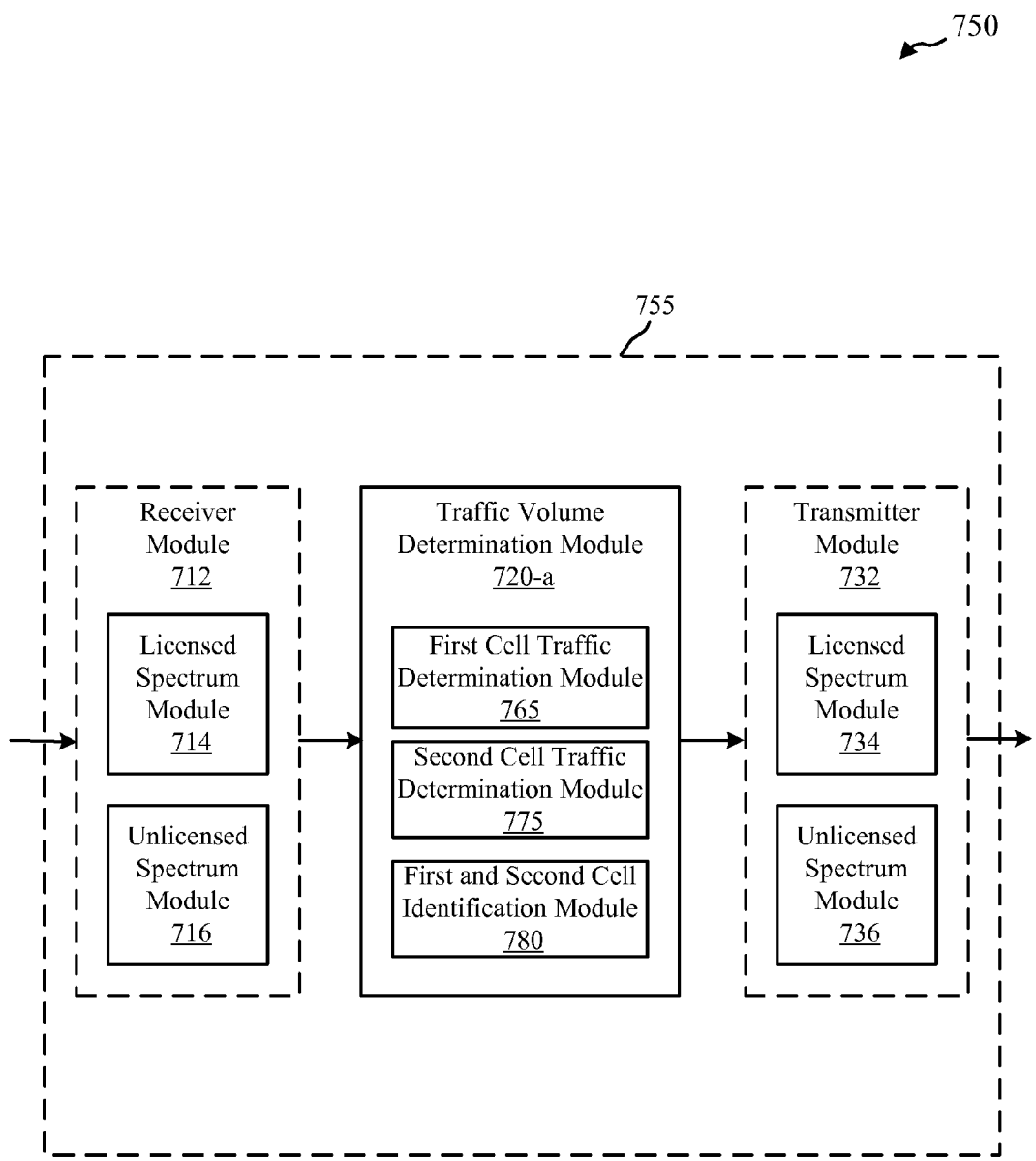

FIGS. 7A and 7B are block diagrams conceptually illustrating devices, such as eNBs or core network elements, for use in traffic volume determination, in accordance with aspects of the present disclosure. Referring first to FIG. 7A, a block diagram 700 illustrates a device 705 for use in traffic volume determination in accordance with various examples. In some examples, the device 705 may be an example of one or more aspects of the access points 105, cell 205, and/or eNB 305, 505, and/or 605; MMEs 232, 532, and/or 632; S-GWs 234, 534, and/or 634; and/or P-GWs 236 and/or 636 described with reference to FIGS. 1, 2, 3, 5, and/or 6. The device 705 may also be a processor. The device 705 may include a receiver module 710, a traffic volume determination module 720, and/or a transmitter module 730. Each of these components may be in communication with each other.

The components of the device 705 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, device 705 may be an example of an access node and the receiver module 710 may be or include a radio frequency (RF) receiver, such as an RF receiver operable to receive transmissions in a licensed spectrum and/or an unlicensed spectrum. The receiver module 710 may be used to receive various types of data and/or control signals (i.e., transmissions) over one or more communication links of a wireless communications system including the licensed and unlicensed spectrums, such as one or more communication links 125, 240, 245, and/or 320-340 described with reference to FIGS. 1, 2, and/or 3. In some examples, device 705 may be an example of a network element of a core network, and the receiver module 710 may be or include a network communications component that may receive network communications via a wired network interface.

In some examples, device 705 may be an example of an access node and the transmitter module 730 may be or include an RF transmitter, such as an RF transmitter operable to transmit in the licensed spectrum and/or the unlicensed spectrum. The transmitter module 730 may be used to transmit various types of data and/or control signals (i.e., transmissions) over one or more communication links of a wireless communications system, such as one or more communication links 125, 240, 245, and/or 320-340 described with reference to FIGS. 1, 2, and/or 3. In some examples, device 705 may be an example of a network element of a core network, and the transmitter module 730 may be or include a network communications component that may receive network communications via a wired network interface.

In some examples, the traffic volume determination module 720 may configure and/or perform traffic volume determination procedures, including determination of traffic volumes served over one or more different cells associated with an access point, such as described above with respect to FIGS. 1-6, for example.

Referring now to FIG. 7B, a block diagram 750 illustrates a device 755 for use in wireless communications in accordance with various examples. In some examples, the device 755 may be an example of one or more aspects of the access points 105, cell 205, and/or eNB 305, 505, and/or 605; MMEs 232, 532, and/or 632; S-GWs 234, 534, and/or 634; and/or P-GWs 236 and/or 636 described with reference to FIGS. 1, 2, 3, 5, and/or 6. The device 705 may also be a processor. The device 755 may include a receiver module 712, a traffic volume determination module 720-a, and/or a transmitter module 732. Each of these components may be in communication with each other.

The components of the device 755 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 712 may be an example of the receiver module 710 of FIG. 7A. In examples where device 755 is included in an access node, the receiver module 712 may be or include a radio frequency (RF) receiver, such as an RF receiver operable to receive transmissions in a licensed spectrum and/or an unlicensed spectrum. The RF receiver may include separate receivers for the licensed spectrum and the unlicensed spectrum. The separate receivers may in some cases take the form of a licensed spectrum module 714 and an unlicensed spectrum module 716. The receiver module 712, including the licensed spectrum module 714 and the unlicensed spectrum module 716, may be used to receive various types of data and/or control signals (i.e., transmissions) over one or more communication links of a wireless communications system including the licensed and unlicensed spectrums, such as one or more communication links of the wireless communications system 100 and/or 300 and/or network architecture 200 described with reference to FIGS. 1, 2 and/or 3.

In some examples, the transmitter module 732 may be an example of the transmitter module 730 of FIG. 7A. In examples where device 755 is included in an access node, the transmitter module 732 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 734 and an unlicensed spectrum module 736. The transmitter module 732 may be used to transmit various types of data and/or control signals (i.e., transmissions) over one or more communication links of a wireless communications system, such as one or more communication links of the wireless communications system 100 and/or 300 and/or network architecture 200 described with reference to FIGS. 1, 2 and/or 3.

The traffic volume determination module 720-a may be an example of the traffic volume determination module 720 described with reference to FIG. 7A and may include a first cell traffic determination module 765, a second cell traffic determination module 775, and/or a first and second cell identification module 780. Each of these components may be in communication with each other.

In some examples, the first cell traffic determination module 765 may determine a traffic volume for traffic served using a first cell. The second cell traffic determination module 775 may determine a traffic volume for traffic served using a second cell. In some examples, the rates for traffic served by the first cell and second cell may be different. First cell and second cell identification module 780 may provide identification and/or other information related to one or both the first cell and second cell, which may be used to determine appropriate charge rates for the particular cell. The traffic volume determination module 720-a alone or in conjunction with receiver module 712 and transmitter module 732, may perform functions related to configuration and/or performance of traffic volume determination procedures, including determination of traffic volumes served over one or more different cells associated with an access point, such as described above with respect to FIGS. 1-6, for example.

Figure 8:
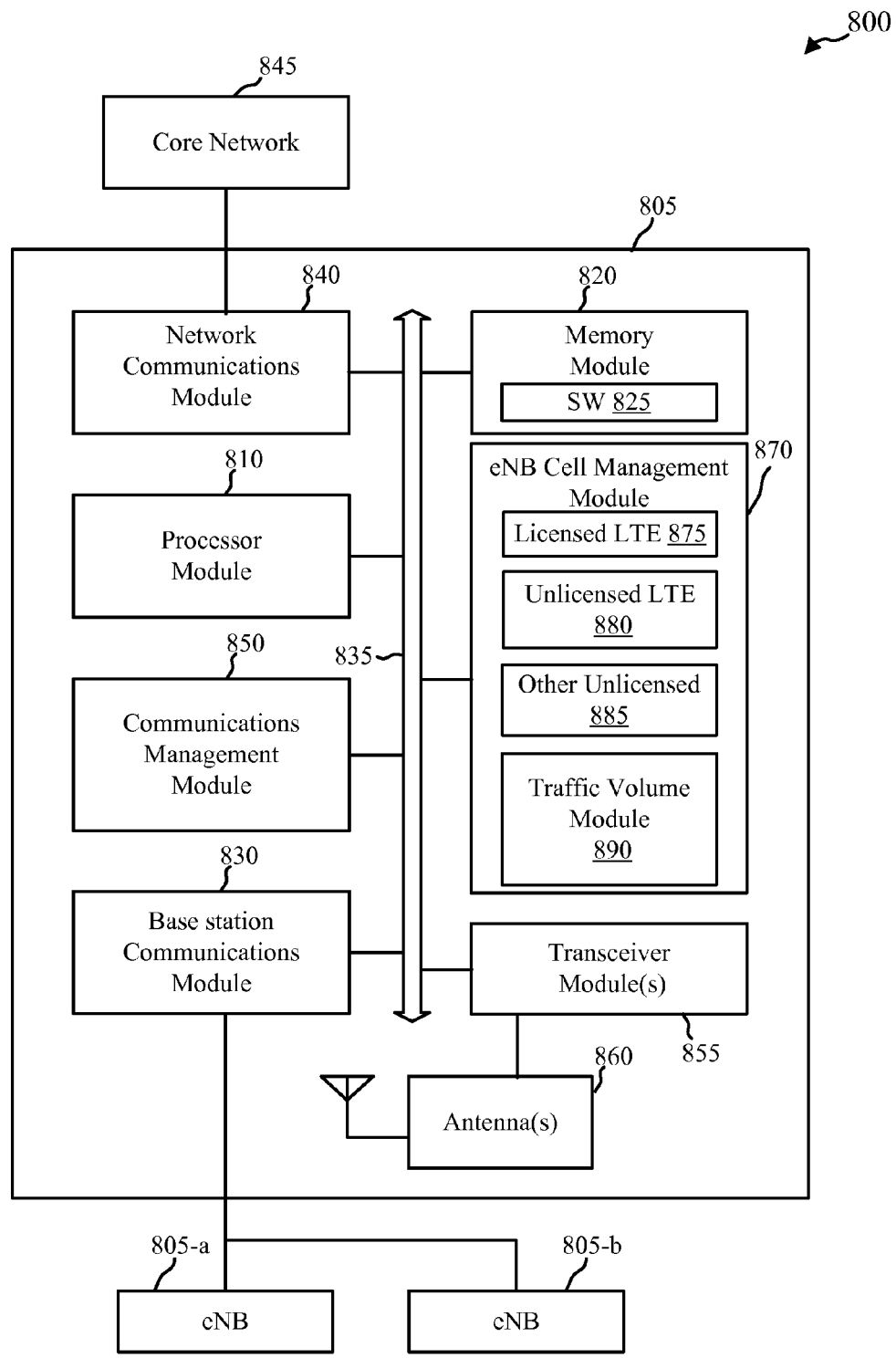
FIG. 8 is a block diagram conceptually illustrating a design of a base station, in accordance with aspects of the present disclosure.

FIG. 8 is a block diagram 800 conceptually illustrating a design of a base station, in accordance with aspects of the present disclosure. In some examples, the base station 805 may be an example of one or more aspects of the access points, cells, eNBs, or devices 105, 205, 305, 505, 605, 705, and/or 755 described with reference to FIGS. 1, 2, 3, 5, 6, 7A, and/or 7B. The base station 805 may be configured to implement at least some of the features and functions for operations of reporting traffic volumes provided by one or more different cells to a UE as described with respect to FIGS. 1, 2, 3, 4, 5, 6A, 6B, 7A, and/or 7B. The base station 805 may include a processor module 810, a memory module 820, at least one transceiver module (represented by transceiver module(s) 855), at least one antenna (represented by antenna(s) 860), and/or an eNB cell management module 870. The base station 805 may also include one or both of a base station communications module 830 and a network communications module 840. Each of these components may be in communication with each other, directly or indirectly, over one or more buses 835.

The memory module 820 may include random access memory (RAM) and/or read-only memory (ROM). The memory module 820 may store computer-readable, computer-executable software (SW) code 825 containing instructions that are configured to, when executed, cause the processor module 810 to perform various functions described herein for reporting of traffic volumes for one or more cells. Alternatively, the software code 825 may not be directly executable by the processor module 810 but be configured to cause the base station 805, e.g., when compiled and executed, to perform various of the functions described herein.

The processor module 810 may include an intelligent hardware device, e.g., a central processing unit (CPU), a microcontroller, an ASIC, etc. The processor module 810 may process information received through the transceiver module(s) 855, the base station communications module 830, and/or the network communications module 840. The processor module 810 may also process information to be sent to the transceiver module(s) 855 for transmission through the antenna(s) 860, to the base station communications module 830 for transmission to one or more other base stations or base stations 805-a and 805-b, and/or to the network communications module 840 for transmission to a core network 845, which may be an example of aspects of the core network 130 and/or 230 described with reference to FIGS. 1 and/or 2, and/or other network elements of a core network described with respect to FIGS. 5 and/or 6. The processor module 810 may handle, alone or in connection with the eNB cell management module 870, various aspects of using two or more cells for wireless communications with one or more UEs, such as described above.

The transceiver module(s) 855 may include a modem configured to modulate the packets and provide the modulated packets to the antenna(s) 860 for transmission, and to demodulate packets received from the antenna(s) 860. The transceiver module(s) 855 may be implemented as one or more transmitter modules and one or more separate receiver modules. The transceiver module(s) 855 may support communications using one or more RATs, such as, for example, communications in at least one licensed spectrum and in at least one unlicensed spectrum. The transceiver module(s) 855 may be configured to communicate bi-directionally, via the antenna(s) 860, with one or more of the UEs or devices 115, 215, 315, 515 and/or 615 described with reference to FIGS. 1, 2, 3, 5 and/or 6, for example. The base station 805 may include multiple antennas 860 (e.g., an antenna array). The base station 805 may communicate with the core network 845 through the network communications module 840. The base station 805 may communicate with other base stations or base stations, such as the base stations 805-a and 805-b, using the base station communications module 830.

According to the architecture of FIG. 8, the base station 805 may further include a communications management module 850. The communications management module 850 may manage communications with other base stations, base stations, and/or devices. The communications management module 850 may be in communication with some or all of the other components of the base station 805 via the bus or buses 835. Alternatively, functionality of the communications management module 850 may be implemented as a component of the transceiver module(s) 855, as a computer program product, and/or as one or more controller elements of the processor module 810.

The eNB cell management module 870 may be configured to perform and/or control some or all of the traffic volume determination and reporting functions or aspects described with reference to FIGS. 1, 2, 3, 4, 5, 6A, 6B, 7A, and/or 7B. The eNB cell management module 870 may include a licensed LTE module 875 configured to handle LTE communications in a licensed spectrum, an unlicensed LTE module 880 configured to handle LTE communications in an unlicensed spectrum, and/or an unlicensed module 885 configured to handle other communications (e.g., Wi-Fi communications in a WLAN) in an unlicensed spectrum. The eNB cell management module 870 may also include a traffic volume module 890 configured to provide, for example, any of the configured to support traffic volume determination and reporting procedures and functions described with reference to FIGS. 1, 2, 3, 4, 5, 6A, 6B, 7A, and/or 7B. The traffic volume module 890 may be an example of similar modules (e.g., traffic volume determination module 720 and/or 720-a) described with reference to FIGS. 7A and/or 7B. The eNB cell management module 870, or portions of it, may include a processor and/or some or all of the functionality of the eNB cell management module 870 may be performed by the processor module 810 and/or in connection with the processor module 810.

Figure 9:
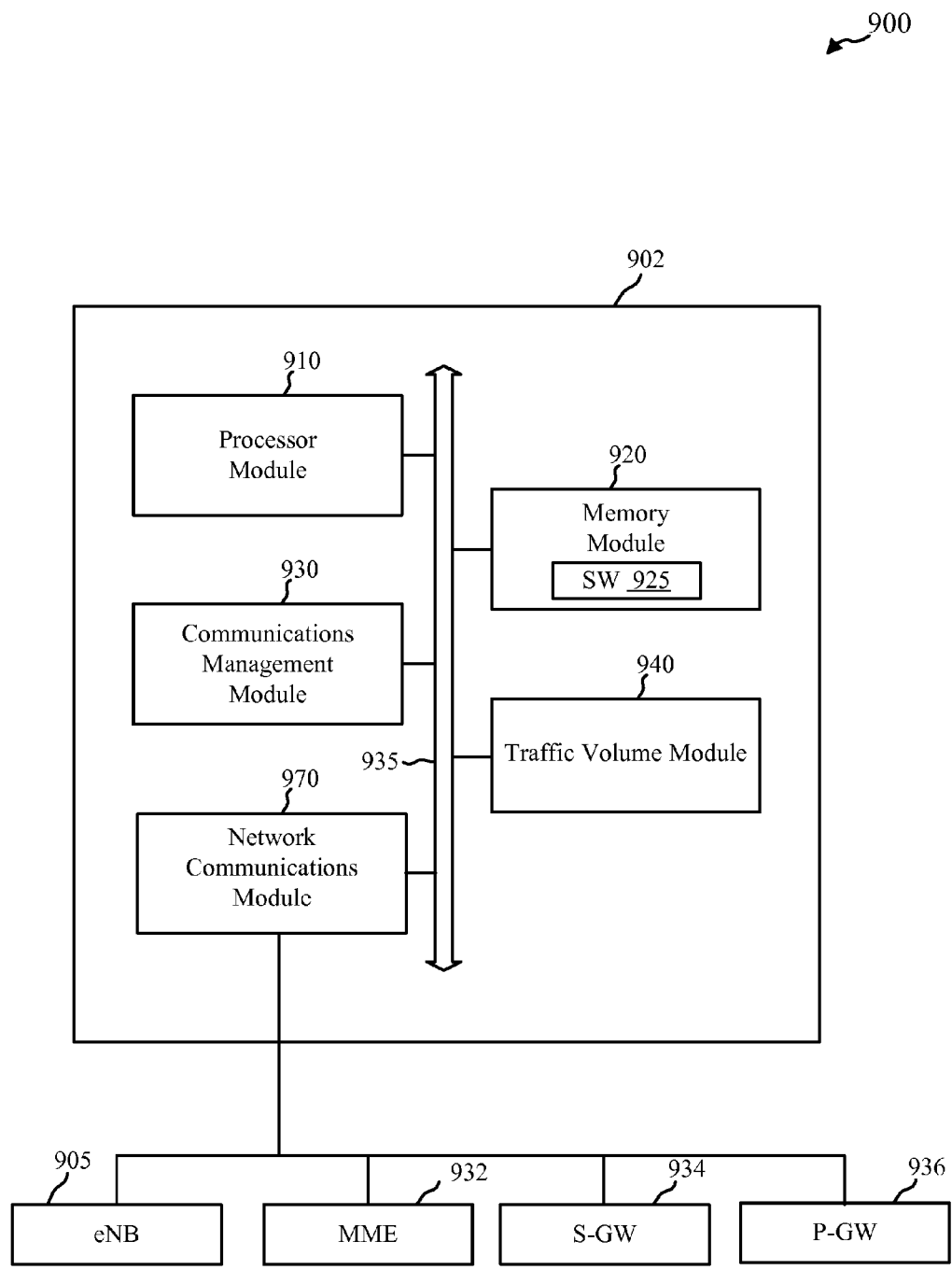
FIG. 9 is a block diagram conceptually illustrating a design of a node in a core network, in accordance with aspects of the present disclosure.

FIG. 9 is a block diagram 900 conceptually illustrating a design of a node in a core network, in accordance with aspects of the present disclosure. Node 902, may be an example of a MME 232, 532, 632, a S-GW 234, 534, 634, or a P-GW 236, 636 in accordance with aspects of the present disclosure. The node 902 may be configured to implement at least some of the features and functions for operations related to traffic volumes provided by one or more different cells to a UE as described with respect to FIGS. 1, 2, 3, 4, 5, 6A, 6B, 7A, 7B, and/or 8. The node 902 may be configured to communicate with one or more of the access points, cells, eNBs, or devices 105, 205, 305, 505, 605, 705, 755 and/or 805 described with reference to FIGS. 1, 2, 3, 5, 6, 7A, 7B, and/or 8.

The node 902 may include a processor module 910, a memory module 920, a communications management module 930, a traffic volume module 940, and a network communications module 970. Each of these components may be in communication with each other, directly or indirectly, over one or more buses 935.

The memory module 920 may include RAM and/or ROM. The memory module 920 may store computer-readable, computer-executable software (SW) code 925 containing instructions that are configured to, when executed, cause the processor module 910 to perform various functions described herein related to traffic volumes provided by one or more different cells to a UE. Alternatively, the software code 925 may not be directly executable by the processor module 910 but be configured to cause the UE 915 (e.g., when compiled and executed) to perform various of the node 902 functions described herein.

The processor module 910 may include an intelligent hardware device, e.g., a CPU, a microcontroller, an ASIC, etc. The processor module 910 may process information received through the network communications module 970 and/or information to other network elements, such as eNB 905, MME 932, S-GW 934, and/or P-GW 936. The processor module 910 may handle, alone or in connection with the traffic volume module 940, various aspects of operations related to traffic volume determination and reporting functions or aspects described with reference to FIGS. 1, 2, 3, 4, 5, 6A, 6B, 7A, 7B, and/or 8.

The communications management module 930 may manage communications with other network elements, such as eNB 905, MME 932, S-GW 934, and/or P-GW 936. The communications management module 930 may be in communication with some or all of the other components of the node 902 via the bus or buses 935. Alternatively, functionality of the communications management module 930 may be implemented as a component of the network communications module 970, as a computer program product, and/or as one or more controller elements of the processor module 910.

The traffic volume module 940 may be configured to perform and/or control some or all of the traffic volume functions or aspects described in FIGS. 1, 2, 3, 4, 5, 6A, 6B, 7A, 7B, and/or 8 related to using traffic volumes served by one or more different cells to a UE for charging functions. For example, the traffic volume module 940 may be configured to receive traffic volume information and generate a CDR based on the traffic volume information. The traffic volume module 940 may be an example of similar modules (e.g., traffic volume determination module 720 and/or 720-a) described with reference to FIGS. 7A and/or 7B. The traffic volume module 940, or portions of it, may include a processor and/or some or all of the functionality of the traffic volume module 940 may be performed by the processor module 910 and/or in connection with the processor module 910.

Figure 10:
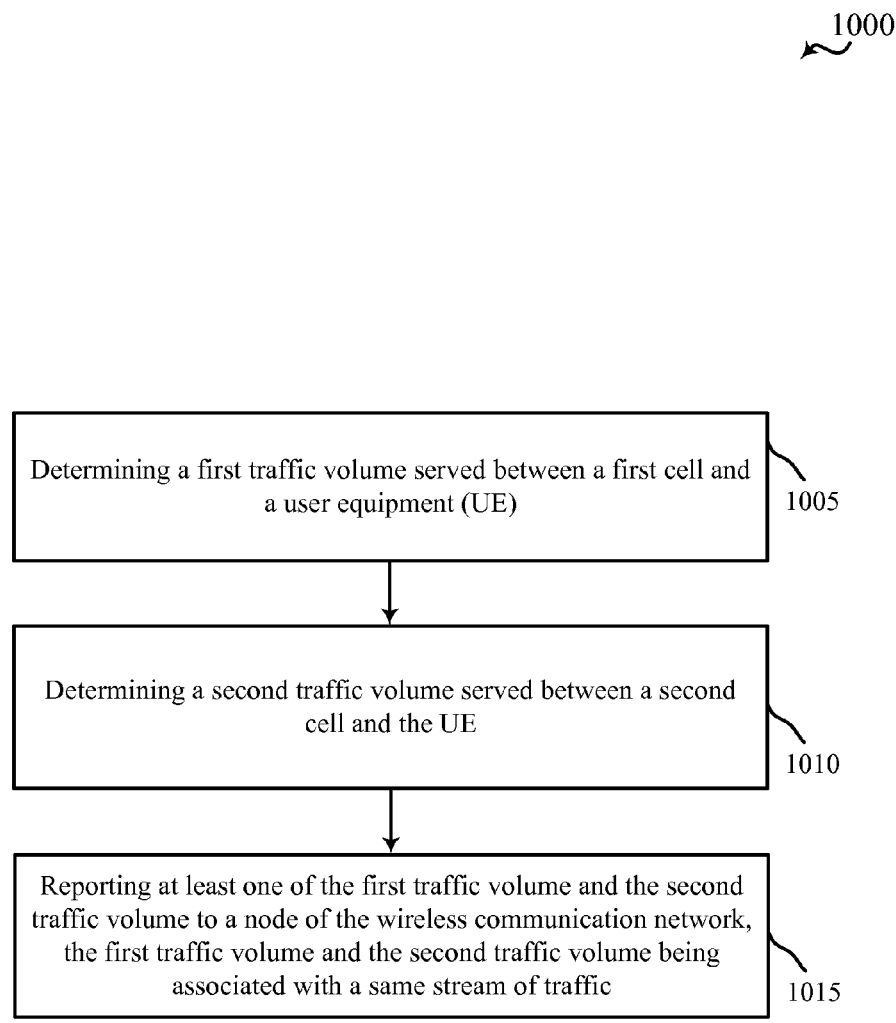
FIG. 10 is a flowchart conceptually illustrating an example of a method of wireless communication, in accordance with aspects of the present disclosure.

FIG. 10 is a flowchart 1000 conceptually illustrating an example of a method of wireless communication, in accordance with aspects of the present disclosure. For clarity, the method 1000 is described below with reference to ones of the access points, cells, eNBs, or devices 105, 205, 305, 505, 605, 705, 755, and/or 805 described with reference to FIGS. 1, 2, 3, 5, 6, 7A, 7B, and/or 8. In one example, an access node or device may execute one or more sets of codes to control the functional elements of the access node or device to perform the functions described below.

At block 1005, a first traffic volume served between a first cell and a UE is determined. The operation(s) at block 1005 may in some cases be performed using the traffic volume determination module 720 in conjunction with the other components described with reference to FIG. 7A, the first cell traffic determination module 765 in conjunction with the other components described with reference to FIG. 7B, and/or eNB cell management module 870 in conjunction with the other components described with reference to FIG. 8.

At block 1010, a second traffic volume served between a second cell and the UE is determined. The operation(s) at block 1010 may in some cases be performed using the traffic volume determination module 720 in conjunction with the other components described with reference to FIG. 7A, the second cell traffic determination module 775 in conjunction with the other components described with reference to FIG. 7B, and/or eNB cell management module 870 in conjunction with the other components described with reference to FIG. 8.

At block 1015, at least one of the first traffic volume and the second traffic volumes is reported to a node of the wireless communication network, the first traffic volume and the second traffic volume being associated with a same stream of traffic. The operation(s) at block 1015 may in some cases be performed using the traffic volume determination module 720 and/or 720-a in conjunction with the other components described with reference to FIGS. 7A and/or 7B, and/or eNB cell management module 870 in conjunction with the other components described with reference to FIG. 8.

Thus, the method 1000 may provide for wireless communications in which traffic volumes associated with different cells may be provided in order to enable, for example, different charging associated with traffic volume served by different cells. It should be noted that the method 1000 is just one implementation and that the operations of the method 1000 may be rearranged or otherwise modified such that other implementations are possible.

Figure 11:
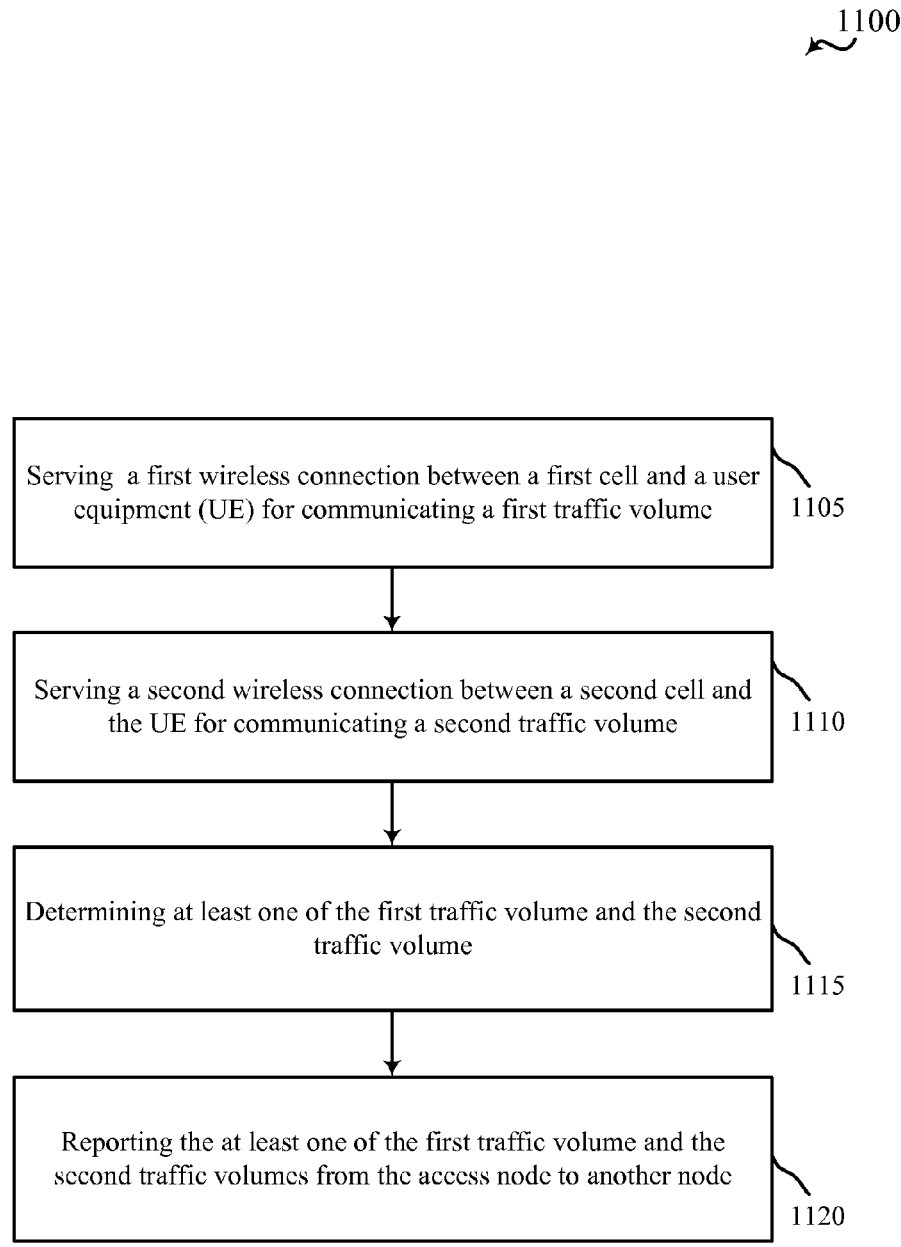
FIG. 11 is another flowchart conceptually illustrating an example of a method of wireless communication, in accordance with aspects of the present disclosure.

FIG. 11 is a flowchart 1100 conceptually illustrating an example of a method of wireless communication, in accordance with aspects of the present disclosure. For clarity, the method 1100 is described below with reference to ones of the access points, cells, eNBs, or devices 105, 205, 305, 505, 605, 705, 755, and/or 805 described with reference to FIGS. 1, 2, 3, 5, 6, 7A, 7B, and/or 8. In one example, an access node or device may execute one or more sets of codes to control the functional elements of the access node or device to perform the functions described below.

At block 1105, a first wireless connection is served between a first cell and a UE for communicating a first traffic volume. The operation(s) at block 1105 may in some cases be performed using the receiver module 710 and transmitter module 730 in conjunction with the other components described with reference to FIG. 7A, the receiver module 712 and transmitter module 732 in conjunction with the other components described with reference to FIG. 7B, and/or transceiver module(s) 855 and antenna(s) 860 in conjunction with the other components described with reference to FIG. 8.

At block 1110, a second wireless connection is served between a second cell and a UE for communicating a second traffic volume. The operation(s) at block 1110 may in some cases be performed using the receiver module 710 and transmitter module 730 in conjunction with the other components described with reference to FIG. 7A, the receiver module 712 and transmitter module 732 in conjunction with the other components described with reference to FIG. 7B, and/or transceiver module(s) 855 and antenna(s) 860 in conjunction with the other components described with reference to FIG. 8.

At block 1115, at least one of the first traffic volume and the second traffic volume is determined. The operation(s) at block 1115 may in some cases be performed using the traffic volume determination module 720 in conjunction with the other components described with reference to FIG. 7A, the first cell traffic determination module 765 and/or the second cell traffic determination module 775 in conjunction with the other components described with reference to FIG. 7B, and/or eNB cell management module 870 in conjunction with the other components described with reference to FIG. 8.

At block 1120, at least one of the first traffic volume and the second traffic volume is reported from the access node to another node. The operation(s) at block 1120 may in some cases be performed using the traffic volume determination module 720 and/or 720-a in conjunction with the other components described with reference to FIGS. 7A and/or 7B, and/or eNB cell management module 870 in conjunction with the other components described with reference to FIG. 8.

Thus, the method 1100 may provide for wireless communications in which traffic volumes associated with different cells may be provided in order to enable, for example, different charging associated with traffic volume served by different cells. It should be noted that the method 1100 is just one implementation and that the operations of the method 1100 may be rearranged or otherwise modified such that other implementations are possible.

Figure 12:
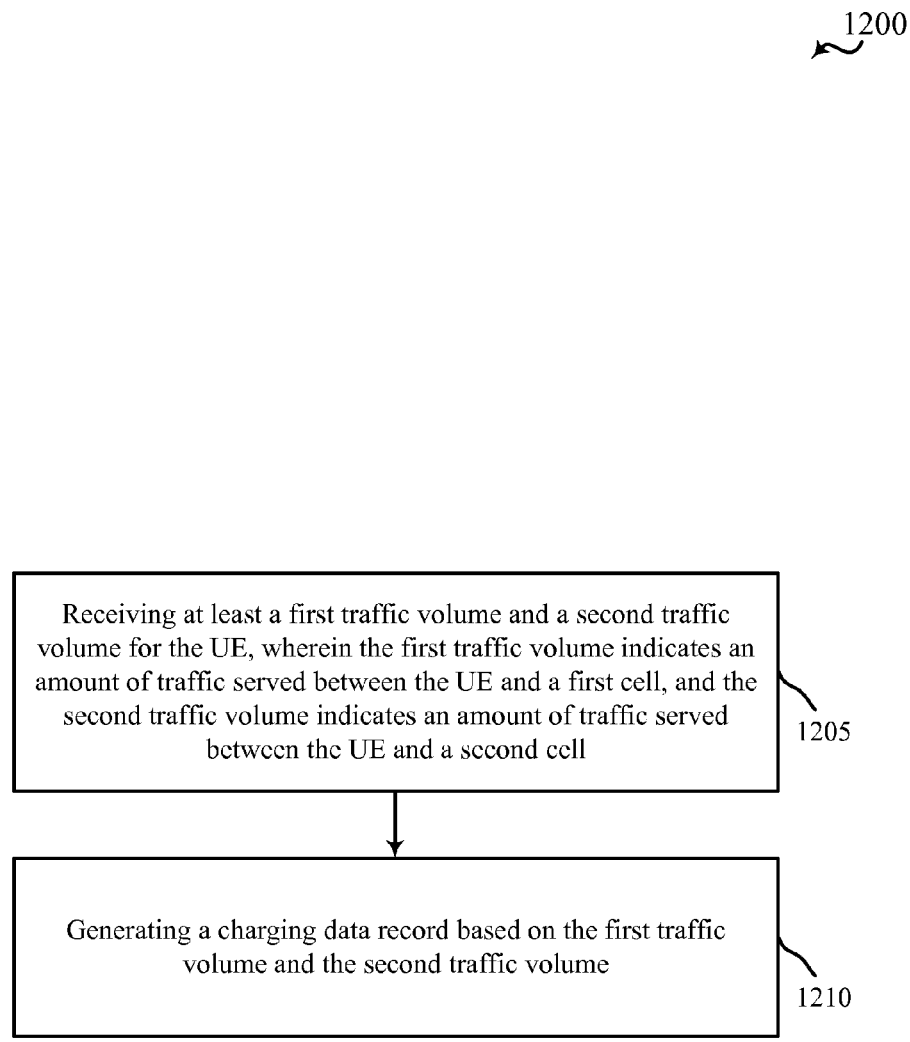
FIG. 12 is yet another flowchart conceptually illustrating an example of a method of wireless communication, in accordance with aspects of the present disclosure.

FIG. 12 is a flowchart 1200 conceptually illustrating an example of a method of wireless communication, in accordance with aspects of the present disclosure. For clarity, the method 1200 is described below with reference to ones of the network elements or devices 232, 234, 236, 532, 534, 632, 634, 636, 705, 755, and/or 902 described with reference to FIGS. 2, 5, 6, 7A, 7B, and/or 9. In one example, a network element or device may execute one or more sets of codes to control the functional elements of the network element or device to perform the functions described below.

At block 1205, at least a first traffic volume and a second traffic volume are received for the UE, the first traffic volume indicating an amount of traffic served over a first wireless connection between the UE and a first cell, and the second traffic volume indicating an amount of traffic served over a second wireless connection between the UE and a second cell. The operation(s) at block 1205 may in some cases be performed using the traffic volume determination module 720 and/or 720-a in conjunction with the other components described with reference to FIGS. 7A and/or 7B, and/or traffic volume module 940 in conjunction with the other components described with reference to FIG. 9.

At block 1210, a charging data record is generated based on the first traffic volume and the second traffic volume. The operation(s) at block 1210 may in some cases be performed using the traffic volume determination module 720 and/or 720-a in conjunction with the other components described with reference to FIGS. 7A and/or 7B, and/or traffic volume module 940 in conjunction with the other components described with reference to FIG. 9.

Thus, the method 1200 may provide for wireless communications in which traffic volumes associated with different cells may be provided in order to enable, for example, different charging associated with traffic served by different cells. It should be noted that the method 1200 is just one implementation and that the operations of the method 1200 may be rearranged or otherwise modified such that other implementations are possible.

Figure 13:
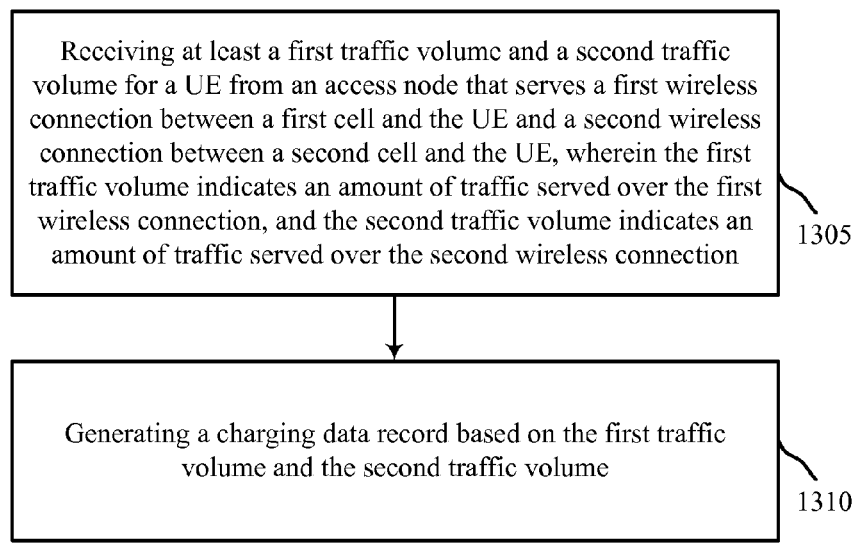
FIG. 13 is still another flowchart conceptually illustrating an example of a method of wireless communication, in accordance with aspects of the present disclosure.

FIG. 13 is a flowchart 1300 conceptually illustrating an example of a method of wireless communication, in accordance with aspects of the present disclosure. For clarity, the method 1300 is described below with reference to ones of the network elements or devices 232, 234, 236, 532, 534, 632, 634, 636, 705, 755, and/or 902 described with reference to FIGS. 2, 5, 6, 7A, 7B, and/or 9. In one example, a network element or device may execute one or more sets of codes to control the functional elements of the network element or device to perform the functions described below.

At block 1305, receiving at least a first traffic volume and a second traffic volume for the UE from an access node that serves a first wireless connection between a first cell and the UE and a second wireless connection between a second cell and the UE, wherein the first traffic volume indicates an amount of traffic served over the first wireless connection, and the second traffic volume indicates an amount of traffic served over the second wireless connection. The operation(s) at block 1305 may in some cases be performed using the traffic volume determination module 720 and/or 720-a in conjunction with the other components described with reference to FIGS. 7A and/or 7B, and/or traffic volume module 940 in conjunction with the other components described with reference to FIG. 9.

At block 1310, a charging data record is generated based on the first traffic volume and the second traffic volume. The operation(s) at block 1310 may in some cases be performed using the traffic volume determination module 720 and/or 720-a in conjunction with the other components described with reference to FIGS. 7A and/or 7B, and/or traffic volume module 940 in conjunction with the other components described with reference to FIG. 9.

Thus, the method 1300 may provide for wireless communications in which traffic volumes associated with different cells may be provided in order to enable, for example, different charging associated with traffic served by different cells. It should be noted that the method 1300 is just one implementation and that the operations of the method 1300 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication in a wireless communications network, comprising:
   determining a first traffic volume served between a first cell and a user equipment (UE), wherein the first cell is a primary cell;
   determining a second traffic volume served between a second cell and the UE, wherein the second cell is a secondary cell, and at least a portion of the second traffic volume is controlled by the primary cell, wherein the first traffic volume and the second traffic volume comprise traffic volumes for each radio bearer served by the first cell and the second cell;
   detecting a trigger associated with at least one of the radio bearers; and
   reporting, based at least in part on the detected trigger, the first traffic volume and the second traffic volume to a node of the wireless communication network.

2. The method of claim 1, wherein the first traffic volume and the second traffic volume are associated with a same stream of traffic.

3. The method of claim 1, wherein one or more of the first traffic volume or the second traffic volume comprises traffic associated with one or more of an Access Point Name (APN), a default data bearer, a dedicated data bearer, an internet protocol (IP) flow, or a transmission control protocol (TCP) connection.

4. The method of claim 1, wherein the first traffic volume is charged differently than the second traffic volume.

5. The method of claim 1, wherein the first cell utilizes a licensed radio frequency spectrum band and the second cell utilizes an unlicensed radio frequency spectrum band.

6. The method of claim 1, wherein the first cell and the second cell utilize different radio access technologies (RATs).

7. The method of claim 1, wherein the first traffic volume and the second traffic volume are determined for one or more of downlink traffic volume or uplink traffic volume.

8. The method of claim 1, wherein the first traffic volume and the second traffic volume comprise data traffic volumes.

9. The method of claim 1, wherein the first traffic volume and the second traffic volume comprise at least one of radio resource control (RRC) signaling traffic volumes, network access stratum (NAS) signaling traffic volumes, and control channel physical signaling traffic volumes.

10. The method of claim 1, wherein the detected trigger is one of radio bearer modification, activation, or deactivation.

11. The method of claim 1, wherein one or more of the first traffic volume and the second traffic volume comprise traffic volumes for each service data flow (SDF) provided by the first cell and the second cell.

12. The method of claim 1, wherein the first traffic volume and the second traffic volume are reported using one or more of a S1-U interface, a GTP-U header, a S1-mobility management entity (MME) interface, or a charging data function (CDF).

13. The method of claim 1, wherein the reporting of the first traffic volume and the second traffic volume is performed periodically.

14. A method for determining user equipment (UE) charge information by a first network element in a wireless communications network, comprising:
receiving, by the first network element, at least a first traffic volume and a second traffic volume for the UE, wherein the first traffic volume indicates an amount of traffic served between the UE and a first cell, wherein the first cell is a primary cell, and the second traffic volume indicates an amount of traffic served between the UE and a second cell, wherein the second cell is a secondary cell, and at least a portion of the second traffic volume is controlled by the primary cell, and wherein the first traffic volume and the second traffic volume comprise traffic volumes for each radio bearer served by the first cell and the second cell; and
generating, by the first network element, a charging data record that collects charging information for the UE on a per bearer basis based at least in part on the first traffic volume and the second traffic volume.

15. The method of claim 14, wherein the first and second traffic volumes are associated with a same stream of traffic provided to the UE.

16. The method of claim 14, further comprising:
forwarding the received first traffic volume and the second traffic volume to a second network element, wherein the first network element comprises one or more of a mobility management entity (MME) or a serving gateway, and the second network element comprises one or more of a serving gateway or packet data network gateway.

17. The method of claim 14, wherein generating the charging data record comprises:
calculating, by the first network element, a charge for the first traffic volume based at least in part on a first charge rate; and
calculating, by the first network element, a charge for the second traffic volume based at least in part on a second charge rate that is different than the first charge rate.

18. The method of claim 14, wherein a wireless connection between the second cell and the UE is established using an unlicensed radio frequency spectrum band.

19. The method of claim 14, wherein the second cell and the first cell utilize different radio access technologies (RATs).

20. An apparatus for wireless communication in a wireless communications network, comprising:
a processor;
memory in electronic communication with the processor; and
instructions stored in the memory executable by the processor to cause the apparatus to:
determine a first traffic volume served between a first cell and a user equipment (UE), wherein the first cell is a primary cell;
determine a second traffic volume served between a second cell and the UE, wherein the second cell is a secondary cell, and at least a portion of the second traffic volume is controlled by the primary cell, wherein the first traffic volume and the second traffic volume comprise traffic volumes for each radio bearer served by the first cell and the second cell;
detect a trigger associated with at least one of the radio bearers; and
report, based at least in part on the detected trigger, the first traffic volume and the second traffic volumes to a node of the wireless communication network.

21. The apparatus of claim 20, wherein the first traffic volume and the second traffic volume are associated with a same stream of traffic.

22. The apparatus of claim 20, wherein the first traffic volume is charged differently than the second traffic volume.

23. The apparatus of claim 20, wherein the first cell utilizes a licensed radio frequency spectrum band and the second cell utilizes an unlicensed radio frequency spectrum band.

24. The apparatus of claim 20, wherein the first cell and the second cell utilize different radio access technologies (RATs).

25. The apparatus of claim 20, wherein the first traffic volume and the second traffic volume are reported using one or more of a S1-U interface, a GTP-U header, a S1-mobility management entity (MME) interface, or a charging data function (CDF).

26. An apparatus for determining user equipment (UE) charge information by a first network element in a wireless communications network, comprising:
a processor;
memory in electronic communication with the processor; and
instructions stored in the memory executable by the processor to cause the apparatus to:
receive at least a first traffic volume and a second traffic volume for the UE, wherein the first traffic volume indicates an amount of traffic served between the UE and a first cell, wherein the first cell is a primary cell, and the second traffic volume indicates an amount of traffic served between the UE and a second cell, wherein the second cell is a secondary cell, and at least a portion of the second traffic volume is controlled by the primary cell, and wherein the first traffic volume and the second traffic volume comprise traffic volumes for each radio bearer served by the first cell and the second cell; and
generate a charging data record that collects charging information for the UE on a per bearer basis based at least in part on the first traffic volume and the second traffic volume.

27. The apparatus of claim 26, wherein the first and second traffic volumes are associated with a same stream of traffic provided to the UE.

28. The apparatus of claim 26, wherein the instructions, when executed by the processor, cause the apparatus to:
forward the received first traffic volume and the second traffic volume to a second network element, wherein the first network element comprises one or more of a mobility management entity (MME) or a serving gateway, and the second network element comprises one or more of a serving gateway or packet data network gateway.

29. The apparatus of claim 26, wherein a wireless connection between the second cell and the UE is established using an unlicensed radio frequency spectrum band.

30. The apparatus of claim 26, wherein the second cell and the first cell utilize different radio access technologies (RATs).

* * * * *